United States Patent
Song et al.

(10) Patent No.: US 10,155,203 B2
(45) Date of Patent: Dec. 18, 2018

(54) METHODS OF ENHANCING WATER FLUX OF A TFC MEMBRANE USING OXIDIZING AND REDUCING AGENTS

(71) Applicants: LG NANOH2O, INC., El Segundo, CA (US); LG CHEM, LTD., Daejeon (KR)

(72) Inventors: Keunwon Song, Daejeon (KR); Young Hoon Ko, Seoul (KR); Evgueni Rozenbaoum, Altadena, CA (US); Chongkyu Shin, Rancho Palos Verdes, CA (US)

(73) Assignees: LG NANOH2O, INC., El Segundo, CA (US); LG CHEM, LTD., Seoul (KR)

( * ) Notice: Subject to any disclaimer, the term of this patent is extended or adjusted under 35 U.S.C. 154(b) by 316 days.

(21) Appl. No.: 15/059,711

(22) Filed: Mar. 3, 2016

(65) Prior Publication Data
US 2017/0252705 A1  Sep. 7, 2017

(51) Int. Cl.
*B01D 67/00* (2006.01)
*B01D 69/02* (2006.01)
(Continued)

(52) U.S. Cl.
CPC ..... *B01D 67/0093* (2013.01); *B01D 67/0095* (2013.01); *B01D 69/02* (2013.01);
(Continued)

(58) Field of Classification Search
CPC ............ B01D 67/0093; B01D 67/0095; B01D 61/025; B01D 71/56; B01D 69/122;
(Continued)

(56) References Cited

U.S. PATENT DOCUMENTS

| 3,133,132 A | 5/1964 | Loeb et al. |
| 3,133,137 A | 5/1964 | Loeb et al. |

(Continued)

FOREIGN PATENT DOCUMENTS

| CA | 2388500 | 4/2001 |
| CA | 2600481 | 9/2006 |

(Continued)

OTHER PUBLICATIONS

Koch TFC 282SS product information (2004).*
(Continued)

*Primary Examiner* — Pamela H Weiss
(74) *Attorney, Agent, or Firm* — Dentons US LLP

(57) ABSTRACT

Provided is a post-formation process for preparation of a highly permeable thin film composite membranes for reverse osmosis, particularly for use with brackish water at low energy conditions. The process includes contacting a polyamide discrimination layer of a TFC membrane with a solution containing an oxidizing agent to form a treated membrane, followed by contacting the treated membrane with a solution containing a reducing agent. The resulting membrane exhibits enhanced water flux while maintaining salt rejection. Also provided are reverse osmosis membranes prepared in accord with the method, and modules containing the highly permeable thin film composite membranes, and methods of purifying water using the membranes or modules.

10 Claims, 1 Drawing Sheet

(51) Int. Cl.
*B01D 69/12* (2006.01)
*B01D 71/56* (2006.01)
*C02F 11/06* (2006.01)
*C02F 1/44* (2006.01)
*B01D 61/02* (2006.01)
*C02F 103/08* (2006.01)

(52) U.S. Cl.
CPC ........... *B01D 69/122* (2013.01); *B01D 71/56* (2013.01); *B01D 61/025* (2013.01); *B01D 2323/42* (2013.01); *B01D 2325/20* (2013.01); *C02F 1/441* (2013.01); *C02F 2103/08* (2013.01)

(58) Field of Classification Search
CPC ................ B01D 2325/20; B01D 69/02; B01D 2323/42; C02F 1/441; C02F 2103/08
See application file for complete search history.

(56) References Cited

U.S. PATENT DOCUMENTS

| | | |
|---|---|---|
| 3,260,691 A | 7/1966 | Lavin et al. |
| 3,351,244 A | 11/1967 | Zandberg et al. |
| 3,367,504 A | 2/1968 | Westmoreland |
| 3,417,870 A | 12/1968 | Bray |
| 3,480,588 A | 11/1969 | Lavin et al. |
| 3,551,331 A | 12/1970 | Cescon et al. |
| 3,567,632 A | 3/1971 | Richter et al. |
| 3,597,393 A | 8/1971 | Bach et al. |
| 3,615,024 A | 10/1971 | Michaels |
| 3,619,424 A | 11/1971 | Bianchard et al. |
| 3,642,707 A | 2/1972 | Frazer |
| 3,648,845 A | 3/1972 | Riley |
| 3,663,510 A | 5/1972 | Peterson |
| 3,687,842 A | 8/1972 | Credali et al. |
| 3,690,811 A | 9/1972 | Horning |
| 3,692,740 A | 9/1972 | Suzuki et al. |
| 3,696,031 A | 10/1972 | Credali et al. |
| 3,710,945 A | 1/1973 | Dismore |
| 3,744,642 A | 7/1973 | Scala et al. |
| 3,791,526 A | 2/1974 | Stana et al. |
| 3,878,109 A | 4/1975 | Ikeda et al. |
| 3,904,519 A | 9/1975 | McKinney et al. |
| 3,906,250 A | 9/1975 | Loeb |
| 3,920,612 A | 11/1975 | Stephens |
| 3,926,798 A | 12/1975 | Cadotte |
| 3,951,815 A | 4/1976 | Wrasidlo |
| 3,993,625 A | 11/1976 | Kurihara et al. |
| 3,996,318 A | 12/1976 | Van Heuven |
| 4,005,012 A | 1/1977 | Wrasidlo |
| 4,020,142 A | 4/1977 | Davis et al. |
| 4,039,440 A | 8/1977 | Cadotte |
| 4,048,144 A | 9/1977 | Stephens |
| 4,051,300 A | 9/1977 | Klein et al. |
| 4,060,488 A | 11/1977 | Hoover et al. |
| 4,092,424 A | 5/1978 | Brandi et al. |
| 4,188,418 A | 2/1980 | Livingston |
| 4,214,994 A | 7/1980 | Kitano et al. |
| 4,244,824 A | 1/1981 | Lange et al. |
| 4,259,183 A | 3/1981 | Cadotte |
| 4,277,344 A | 7/1981 | Cadotte |
| 4,337,154 A | 6/1982 | Fukuchi et al. |
| 4,387,024 A | 6/1983 | Kurihara et al. |
| 4,388,189 A | 6/1983 | Kawaguchi et al. |
| 4,392,960 A | 7/1983 | Kraus et al. |
| 4,492,721 A | 1/1985 | Joosten et al. |
| 4,559,139 A | 12/1985 | Uemura et al. |
| 4,567,009 A | 1/1986 | Badenhop et al. |
| 4,606,943 A | 8/1986 | Rak et al. |
| 4,693,985 A | 9/1987 | Degen et al. |
| 4,707,266 A | 11/1987 | Degen et al. |
| 4,713,438 A | 12/1987 | Harris et al. |
| 4,740,219 A | 4/1988 | Kulprathipanja et al. |
| 4,754,016 A | 6/1988 | Ai et al. |
| 4,761,234 A | 8/1988 | Uemura et al. |
| 4,762,619 A | 8/1988 | Gaddis et al. |
| 4,765,897 A | 8/1988 | Cadotte et al. |
| 4,765,915 A | 8/1988 | Diehl |
| 4,769,148 A | 9/1988 | Fibiger et al. |
| 4,778,596 A | 10/1988 | Linder et al. |
| 4,795,559 A | 1/1989 | Shinjou et al. |
| 4,814,082 A | 3/1989 | Wrasidlo |
| 4,830,885 A | 5/1989 | Tran et al. |
| 4,833,014 A | 5/1989 | Linder et al. |
| 4,840,977 A | 6/1989 | Crivello et al. |
| 4,842,736 A | 6/1989 | Bray et al. |
| 4,855,048 A | 8/1989 | Tang et al. |
| 4,859,384 A | 8/1989 | Fibiger et al. |
| 4,872,984 A | 10/1989 | Tomaschke |
| 4,888,166 A | 12/1989 | Logan |
| 4,902,424 A | 2/1990 | Wrasidlo |
| 4,911,844 A | 3/1990 | Linder et al. |
| 4,931,362 A | 6/1990 | Zsifkovits et al. |
| 4,948,506 A | 8/1990 | Lonsdale et al. |
| 4,948,507 A | 8/1990 | Tomaschke |
| 4,950,404 A | 8/1990 | Chau |
| 4,971,697 A | 11/1990 | Douden et al. |
| 4,983,291 A | 1/1991 | Chua et al. |
| 5,002,590 A | 3/1991 | Friesen et al. |
| 5,017,680 A | 5/1991 | Sublett |
| 5,019,261 A | 5/1991 | Stengaard |
| 5,024,594 A | 6/1991 | Athayde et al. |
| 5,028,337 A | 7/1991 | Linder et al. |
| 5,032,268 A | 7/1991 | Hahn |
| 5,051,178 A * | 9/1991 | Uemura ............... B01D 69/125 210/490 |
| 5,069,945 A | 12/1991 | Wrasidlo |
| 5,084,179 A | 1/1992 | Knight |
| 5,089,460 A | 2/1992 | Chien |
| 5,091,086 A | 2/1992 | Stengaard |
| 5,096,584 A | 3/1992 | Reddy et al. |
| 5,098,575 A | 3/1992 | Yaeli |
| 5,104,632 A | 4/1992 | Douden et al. |
| 5,108,607 A | 4/1992 | Kraus et al. |
| 5,114,582 A | 5/1992 | Sandstrom et al. |
| 5,130,025 A | 7/1992 | Lefebvre et al. |
| 5,147,541 A | 9/1992 | McDermott, Jr. et al. |
| 5,154,829 A | 10/1992 | Degen et al. |
| 5,160,617 A | 11/1992 | Huis In't Veld et al. |
| 5,160,673 A | 11/1992 | Wollbeck et al. |
| 5,173,189 A | 12/1992 | Hoshi et al. |
| 5,183,566 A | 2/1993 | Darnell et al. |
| 5,190,654 A | 3/1993 | Bauer |
| 5,234,598 A | 8/1993 | Tran et al. |
| 5,254,261 A | 10/1993 | Tomaschke et al. |
| 5,258,203 A | 11/1993 | Arthur |
| 5,262,054 A | 11/1993 | Wheeler |
| 5,269,926 A | 12/1993 | Webster et al. |
| 5,281,430 A | 1/1994 | Herron et al. |
| 5,342,431 A | 8/1994 | Anderson et al. |
| 5,376,442 A | 12/1994 | Davidson et al. |
| 5,435,957 A | 7/1995 | Degen et al. |
| 5,462,667 A | 10/1995 | Wollinsky et al. |
| 5,484,528 A | 1/1996 | Yagi et al. |
| 5,538,642 A | 7/1996 | Solie |
| 5,543,046 A | 8/1996 | Van Rijn |
| 5,576,057 A | 11/1996 | Hirose et al. |
| 5,614,099 A | 3/1997 | Hirose et al. |
| 5,650,479 A | 7/1997 | Glugla et al. |
| 5,658,460 A | 8/1997 | Cadotte et al. |
| 5,681,467 A | 10/1997 | Solie et al. |
| 5,681,473 A | 10/1997 | Miller et al. |
| 5,693,227 A | 12/1997 | Costa |
| 5,733,602 A | 3/1998 | Hirose et al. |
| 5,755,964 A | 5/1998 | Mickols |
| 5,783,079 A | 7/1998 | Kumano et al. |
| 5,800,706 A | 9/1998 | Fischer |
| 5,843,351 A | 12/1998 | Hirose et al. |
| 5,876,602 A * | 3/1999 | Jons ............... B01D 67/0093 210/500.38 |
| 5,914,039 A | 6/1999 | Mahendran et al. |
| 5,919,026 A | 7/1999 | Appleton |
| 5,938,934 A | 8/1999 | Balogh et al. |

(56) References Cited

U.S. PATENT DOCUMENTS

| | | | |
|---|---|---|---|
| 5,989,426 A | 11/1999 | Hirose et al. |
| 6,015,495 A | 1/2000 | Koo et al. |
| 6,024,872 A | 2/2000 | Mahendran et al. |
| 6,024,873 A | 2/2000 | Hirose et al. |
| 6,117,341 A | 9/2000 | Bray et al. |
| 6,153,133 A | 11/2000 | Kaimai et al. |
| 6,156,680 A | 12/2000 | Goettmann |
| 6,156,867 A | 12/2000 | Aoyama et al. |
| 6,162,358 A | 12/2000 | Li et al. |
| 6,171,497 B1* | 1/2001 | Hirose ............... B01D 67/0093 |
| | | 210/321.6 |
| 6,177,011 B1 | 1/2001 | Hachisuka et al. |
| 6,185,940 B1 | 2/2001 | Prueitt |
| 6,187,192 B1 | 2/2001 | Johnston et al. |
| 6,241,893 B1 | 6/2001 | Levy |
| 6,245,234 B1 | 6/2001 | Koo et al. |
| 6,277,282 B1 | 8/2001 | Kihara et al. |
| 6,284,137 B1 | 9/2001 | Hajikano et al. |
| 6,309,546 B1 | 10/2001 | Hermann et al. |
| 6,337,018 B1 | 1/2002 | Mickols |
| 6,368,507 B1 | 4/2002 | Koo et al. |
| 6,391,205 B1 | 5/2002 | McGinnis |
| 6,406,626 B1 | 6/2002 | Murakami et al. |
| 6,413,425 B1 | 7/2002 | Haschisuka et al. |
| 6,425,936 B1 | 7/2002 | Sammons et al. |
| 6,472,016 B1 | 10/2002 | Soria et al. |
| 6,540,915 B2 | 4/2003 | Patil |
| 6,551,536 B1 | 4/2003 | Kwak et al. |
| 6,562,266 B2 | 5/2003 | Mickols |
| 6,582,495 B2 | 6/2003 | Chau et al. |
| 6,585,802 B2 | 7/2003 | Koros et al. |
| 6,605,140 B2 | 8/2003 | Guiver et al. |
| 6,652,751 B1 | 11/2003 | Kutowy et al. |
| 6,710,017 B2 | 3/2004 | Unhoch et al. |
| 6,723,241 B2 | 4/2004 | Mickols |
| 6,753,396 B2 | 6/2004 | Ulbricht et al. |
| 6,755,900 B2 | 6/2004 | Koros et al. |
| 6,821,430 B2 | 11/2004 | Andou et al. |
| 6,837,996 B2 | 1/2005 | Kurth et al. |
| 6,841,075 B2 | 1/2005 | Penth et al. |
| 6,841,601 B2 | 1/2005 | Serpico et al. |
| 6,878,278 B2 | 4/2005 | Mickols |
| 6,890,436 B2 | 5/2005 | Komatsu et al. |
| 6,881,336 B2 | 8/2005 | Johnson |
| 7,018,538 B2 | 3/2006 | Leiser et al. |
| 7,048,855 B2 | 5/2006 | de la Cruz |
| 7,109,140 B2 | 9/2006 | Marand et al. |
| 7,138,058 B2 | 11/2006 | Kurth et al. |
| 7,182,894 B2 | 2/2007 | Kumar et al. |
| 7,211,320 B1 | 5/2007 | Cooper et al. |
| 7,311,982 B2 | 12/2007 | Christou et al. |
| 7,459,121 B2 | 12/2008 | Liang et al. |
| 7,490,725 B2 | 2/2009 | Pinnau et al. |
| 7,494,963 B2 | 2/2009 | Ahmed et al. |
| 7,501,027 B2 | 3/2009 | Ahmed et al. |
| 7,511,006 B2 | 3/2009 | Shimmin et al. |
| 7,537,776 B1 | 5/2009 | Beilfuss et al. |
| 7,560,421 B2 | 7/2009 | Nakada et al. |
| 7,569,212 B2 | 8/2009 | Wagenaar |
| 7,604,746 B2 | 10/2009 | Childs et al. |
| 7,871,522 B2 | 1/2011 | Stover et al. |
| 7,955,656 B2 | 6/2011 | Murayama et al. |
| 8,002,989 B2 | 8/2011 | McGinnis |
| 8,011,517 B2 | 9/2011 | Allen et al. |
| 8,017,050 B2 | 9/2011 | Freeman et al. |
| 8,029,857 B2 | 10/2011 | Hoek et al. |
| 8,147,735 B2 | 4/2012 | Buschmann |
| 8,163,814 B2 | 4/2012 | Emrick et al. |
| 8,177,978 B2 | 5/2012 | Kurth et al. |
| 8,236,178 B2 | 8/2012 | Ruehr et al. |
| 8,443,986 B2 | 5/2013 | Tanaka et al. |
| 8,505,743 B2 | 8/2013 | Sarkar et al. |
| 8,505,745 B2 | 8/2013 | Mayes et al. |
| 8,507,612 B2 | 8/2013 | Zhu |
| 8,551,388 B2 | 10/2013 | Chalker et al. |
| 8,567,612 B2 | 10/2013 | Kurth et al. |
| 8,580,341 B2 | 11/2013 | Wang et al. |
| 8,603,340 B2 | 12/2013 | Kurth et al. |
| 8,754,139 B2 | 6/2014 | Allen et al. |
| 8,801,635 B2 | 8/2014 | Hovorka |
| 8,801,935 B2 | 8/2014 | Koehler et al. |
| 9,022,227 B2 | 5/2015 | Na et al. |
| 2002/0074282 A1 | 6/2002 | Herrmann et al. |
| 2002/0187401 A1 | 12/2002 | Lee et al. |
| 2003/0116498 A1 | 6/2003 | Mickols |
| 2003/0116503 A1 | 6/2003 | Wang et al. |
| 2003/0121844 A1 | 7/2003 | Koo et al. |
| 2003/0132174 A1 | 7/2003 | Isomura et al. |
| 2004/0007529 A1* | 1/2004 | Blyankman ........ B01D 67/0093 |
| | | 210/652 |
| 2004/0178135 A1 | 9/2004 | Beplate |
| 2004/0234751 A1 | 11/2004 | Sakurai et al. |
| 2005/0077243 A1 | 4/2005 | Pineau et al. |
| 2005/0139066 A1 | 6/2005 | Miller et al. |
| 2005/0145568 A1 | 7/2005 | McGinnis |
| 2005/0173341 A1 | 8/2005 | Salinaro |
| 2005/0230305 A1 | 10/2005 | Kulkami et al. |
| 2006/0032823 A1* | 2/2006 | Harrison ................. A61L 2/18 |
| | | 210/754 |
| 2006/0062902 A1 | 3/2006 | Sager et al. |
| 2006/0063911 A1 | 3/2006 | Cayton et al. |
| 2006/0175256 A1 | 8/2006 | Masten et al. |
| 2006/0201884 A1 | 9/2006 | Kulprathipanja et al. |
| 2006/0204812 A1 | 9/2006 | Moriyama et al. |
| 2006/0249447 A1 | 11/2006 | Yeager |
| 2007/0272628 A1 | 11/2007 | Mickols et al. |
| 2008/0149561 A1 | 6/2008 | Chu et al. |
| 2008/0173583 A1* | 7/2008 | Boodoo ................... C02F 1/42 |
| | | 210/652 |
| 2008/0237126 A1 | 10/2008 | Hoek et al. |
| 2008/0251447 A1 | 10/2008 | Koumoto et al. |
| 2008/0295951 A1 | 12/2008 | Hiro et al. |
| 2009/0050558 A1 | 2/2009 | Ishizuka et al. |
| 2009/0159527 A1 | 6/2009 | Mickols et al. |
| 2009/0272692 A1 | 11/2009 | Kurth et al. |
| 2010/0006495 A1 | 1/2010 | Buschmann |
| 2010/0025330 A1 | 2/2010 | Ratto et al. |
| 2010/0044902 A1 | 2/2010 | Ohara et al. |
| 2010/0051538 A1 | 3/2010 | Freeman et al. |
| 2010/0062156 A1 | 3/2010 | Kurth et al. |
| 2010/0193428 A1 | 8/2010 | Hane et al. |
| 2011/0031180 A1 | 2/2011 | Tada et al. |
| 2011/0155660 A1 | 6/2011 | Mickols et al. |
| 2011/0174728 A1 | 7/2011 | Eisen et al. |
| 2011/0297614 A1* | 12/2011 | Ikuno ..................... A01N 59/00 |
| | | 210/639 |
| 2012/0048798 A1 | 3/2012 | Cheng et al. |
| 2012/0080058 A1* | 4/2012 | Isaias ................... B01D 61/025 |
| | | 134/28 |
| 2012/0111791 A1 | 5/2012 | Freeman et al. |
| 2012/0285890 A1 | 11/2012 | Koehler et al. |
| 2012/0292249 A1 | 11/2012 | Wang et al. |
| 2013/0284664 A1 | 10/2013 | Takagi et al. |
| 2013/0287946 A1 | 10/2013 | Jons et al. |
| 2014/0014575 A1 | 1/2014 | Kwon et al. |
| 2014/0050846 A1 | 2/2014 | Kurth et al. |
| 2015/0107455 A1 | 4/2015 | Mayer et al. |

FOREIGN PATENT DOCUMENTS

| | | |
|---|---|---|
| CN | 101695636 | 4/2010 |
| CN | 101816900 | 9/2010 |
| EP | 0348041 | 12/1989 |
| JP | 63-012310 | 1/1988 |
| JP | 04-126529 | 4/1992 |
| JP | 05-245349 | 9/1993 |
| JP | H08-182921 | 7/1996 |
| JP | 2000-225327 | 8/2000 |
| JP | 2006-187731 | 7/2006 |
| KR | 1020010100304 | 11/2001 |
| KR | 1020050077141 | 8/2005 |
| WO | 2000/076641 | 12/2000 |
| WO | 2000/078437 | 12/2000 |

(56) References Cited

FOREIGN PATENT DOCUMENTS

| WO | 2001/078882 | 10/2001 | |
|---|---|---|---|
| WO | 2002/004082 | 1/2002 | |
| WO | 2002/015299 | 2/2002 | |
| WO | 2002/051528 | 7/2002 | |
| WO | 2003/047734 | 6/2003 | |
| WO | 2003/097218 | 11/2003 | |
| WO | 2003/097221 | 11/2003 | |
| WO | 2004/022491 | 3/2004 | |
| WO | 2005/014266 | 2/2005 | |
| WO | 2005/023414 | 3/2005 | |
| WO | 2005/057700 | 6/2005 | |
| WO | 2006/030411 | 3/2006 | |
| WO | 2006/098872 | 9/2006 | |
| WO | 2006/135384 | 12/2006 | |
| WO | 2007/001405 | 1/2007 | |
| WO | 2007/024461 | 3/2007 | |
| WO | 2007/035019 | 3/2007 | |
| WO | 2007/050408 | 5/2007 | |
| WO | 2007/065866 | 6/2007 | |
| WO | 2007/084169 | 7/2007 | |
| WO | 2007/095363 | 8/2007 | |
| WO | 2007/133362 | 11/2007 | |
| WO | 2007/133609 | 11/2007 | |
| WO | 2008/057842 | 5/2008 | |
| WO | 2008/066939 | 6/2008 | |
| WO | 2008/091658 | 7/2008 | |
| WO | 2008/118228 | 10/2008 | |
| WO | 2009/129354 | 10/2009 | |
| WO | 2009/155462 | 12/2009 | |
| WO | 2010/123518 | 10/2010 | |
| WO | 2011/008549 | 1/2011 | |
| WO | 2014/080426 | 5/2014 | |
| WO | WO 2015073170 A1 * | 5/2015 | ............ B01D 65/08 |

OTHER PUBLICATIONS

Of Dow Liquid Separations Filmtec Elements (1997).*
Alexandre et al., "Polymer-layered silicate nanocomposites: preparation, properties and uses of a new class of materials," Materials Science and Engineering, 28 (2000):1-63.
Arthur, "Structure-Property Relationship in a Thin Film Composite Reverse Osmosis Membrane," Journal of Membrane Science, 1989, 46:243-260.
Bae et al., "Preparation of $TiO_2$ self-assembled polymeric nanocomposite membranes and examination of their fouling mitigation effects in a membrane bioreactor system," J. Membrane Science, 266 (2005):1-5.
Bermudez et al, "Infinite Dilution Activity Coefficients in Tributyl Phosphate and Triacetin," J. Chem. Eng. Data, 2000, 45:1105-1107.
Bhattacharyya et al., "An Overview of Selected Membrane Techniques for Environmental Applications," J. Chin. Inst. Chan. Eners., 2002, 33(1):62-66.
Boom et al., "Microstructures in phase inversion membranes. Part 2. The role of a polymeric additive," J. Membrane Science, 73 (1992):277-292.
Cadotte et al., "Advanced Poly (Piperazineamide) Reverse Osmosis Membranes" NTIS: Final Report, 1979, pp. 1-48.
Cadotte et al., "Continued Evaluation of In Situ-Formed Condensation Polymers for Reverse Osmosis Membranes" NTIS: Final Report, 1976, pp. 1-80 (92 pages total).
Cadotte et al., "Research on 'In Situ'—Formed Condensation Polymer for Reverse Osmosis Membranes" NTIS: Final Report, 1978, pp. 1-44 (56 pages total).
Cadotte, J.E., "Evolution of Composite Reverse Osmosis Membranes," Materials Science of Synthetic Membranes, 1985, pp. 273-294.
Camblor et al. "Characterization of nanocrystalline zeolite Beta," Microporous and Mesoporous Materials, 1998, 25(1-3):59-74.
Chui, et al. "A Chemically Functionalizable Nanoporous Material [Cu3(TMA)2(H20)3b," Science, 1999, 283:1148-1150.

Donose et al., "Effect of pH on the ageing or reverse osmosis membranes upon exposure to hypochlorite," Desalination 309: 97-105 (2013).
Freger et al., "TFC polyamide membranes modified by grafting of hydrophilic polymers: an FT-IR/AFM/TEM study," J. Membrane Science, 209 (2002):283-292.
Goosen et al., "Fouling of Reverse Osmosis and Ultrafiltration Membranes: A Critical Review," Separation Science and Technology, 39(10):2261-2298 (2004).
Hoek et al., "Influence of Crossflow Membrane Filter Geometry and Shear Rate on Colloidal Fouling in Reverse Osmosis and Nanofiltration Separations," Environ. Engineering Science, 19(6):357-372 (2002).
Hoek et al., "Cake-Enhanced Concentration Polarization: A New Fouling Mechanism for Salt-Rejecting Membranes," Environ. Sci. Technol., 37 (2003):5581-5588.
Hoek et al., "Effect of Membrane Surface Roughness on Colloid—Membrane DLVO Interactions," Langmuir, 19 (2003):4836-4847.
Holmberg et al. "Controlling size and yield of zeolite Y nanocrystals using tetramethylammonium bromide," Microporous and Mesoporous Materials, 2003, 59(1):13-28.
Jeong et al., "Interfacial polymerization of thin film nanocomposites: A new concept for reverse osmosis membranes," Journal of Membrane Science, 2007, 294:1-7.
Kang et al., "A Novel Method of Surface Modification on Thin-Film Composite Reverse Osmosis Membrane by Grafting (Ethylene Glycol)" Polymer, 2007, 48(5):1165-1170.
Kang et al., "Direct observation of biofouling in cross-flow microfiltration: mechanisms of deposition and release," J. Membrane Science, 244(1-2):151-165 (2004).
Kang et al., "Study on hypochlorite degradation of aromatic polyamide reverse osmosis membrane," J Membrane Science 300: 165-171 (2007).
Kwon et al., "Change of Membrane Performance Due to Chlorination of Crosslinked Polyamide Membranes," J Applied Polymer Science 102: 5895-5902 (2006).
Kwon et al., "Hypochlorite degradation of crosslinked polyamide membranes II. Changes in hydrogen bonding behavior and performance," J Membrane Science 282: 456-464 (2006).
Lau et al., "A recent progress in thin film composite membrane: A review," Desalination, 287 (2012):190-199.
Lee et al., "Effect of Operating Conditions on CaSO4 Scale Formation Mechanism in Nanofiltration for Water Softening," Wat. Res. 34(15):3854-3866 (2000).
Lemanski et al., "Effect of shell-side flows on the performance of hollow-fiber gas separation modules," J. Membrane Science, 195 (2001):215-228.
Li et al., "Organic Fouling and Chemical Cleaning of Nanofiltration Membranes: Measurements and Mechanisms," Environ. Sci. Technol., 38 (2004):4683-4693.
Lohokare et al., "Effect of Support Material on Ultrafiltration Membrane Performance," J. Applied Polymer Science, 99 (2006):3389-3395.
McDonnell et al., "Hydrophilic and Antimicrobial Zeolite Coatings for Gravity-Independent Water Separation," Adv. Funct. Mater., 15(2):336-340 (2005).
Rong et al., "Structure-property relationships of irradiation grafted nano-inorganic particle filled polypropylene composites," Polymer 42 (2001):167-183.
Rowsell et al., "Metal-organic frameworks: a new class of porous materials," Microporous and Mesoporous Materials, 73 (2004):3-14.
Simon et al., "Effects of hypochlorite exposure on morphology and trace organic contaminant rejection by NF/RO membranes," Membrane Water Treatment 5(5): 235-250 (2014).
Van et al., "Surface reaction kinetics of metal β-diketonate precursors with O radicals in radical-enhanced atomic layer deposition of metal oxides," Applied Surface Science, 246 (2005):250-261.
Vrijenhoek et al., "Influence of membrane surface properties on initial rate of colloidal fouling of reverse osmosis and nanofiltration membranes," J. Membrane Science, 188 (2001):115-128.

(56) References Cited

OTHER PUBLICATIONS

Walker et al., "A Novel Asymmetric Clamping Cell for Measuring Streaming Potential of Flat Surfaces," Langmuir, 18 (2002):2193-2198.
Wang et al., "Formation of semi-permeable polyamide skin layers on the surface of supported liquid membranes," Journal of Membrane Science, 1998, 147:109-116.
Wang et al., "Direct Observation of Microbial Adhesion of Membranes," Environ. Sci. Technol., 39 (2005):6461-6469.
Ward, "Chlorine Residual Measurement in Chloraminated Systems," presented at the 76th Annual WIOA Victoria Water Industry Conference and Exhibition, Bendigo Exhibition Center, Sep. 3-5, 2013.
Wei et al., "A novel method of surface modification on thin-film-composite reverse osmosis membrane by grafting hydantoin derivative," J. Membrane Science, 346 (2010):152-162.
Wei et al., "Surface modification of commercial aromatic polyamide reverse osmosis membranes by graft polymerization of 3-allyl-5,5-dimethylhydantoin," J. Membrane Science, 351 (2010):222-233.
Zhu et al., "Colloidal Fouling of Reverse Osmosis Membranes: Measurements and Fouling Mechanisms," Environ. Sci. Technol., 31 (1997):3654-3662.

* cited by examiner

METHODS OF ENHANCING WATER FLUX OF A TFC MEMBRANE USING OXIDIZING AND REDUCING AGENTS

FIELD OF THE INVENTION

The present invention relates to thin film composite (TFC) membranes, including membranes used for nanofiltration, reverse or forward osmosis, e.g., to purify water, including tap water, brackish water and sea water, and more particularly to methods for enhancing water flux in TFC membranes after formation of the discrimination layer, the processes including exposing the discrimination layer of the membrane to a solution containing an oxidizing agent, followed by exposing the treated membrane to a reducing agent, whereby the water flux is improved while having minimal negative impact on, or maintaining or improving, salt rejection characteristics of the membranes.

BACKGROUND OF THE INVENTION

A thin film composite (TFC) membrane is a membrane that has layers of dissimilar materials joined together to form a single membrane. This layered construction permits the use of material combinations that optimize performance and durability of the membrane.

TFC membranes are used in nanofiltration, reverse osmosis (RO) and forward osmosis membranes. Such membranes typically are made by interfacial polymerization of a monomer in a nonpolar (e.g., organic) phase together with a monomer in a polar (e.g., aqueous) phase on a porous support membrane. TFC membranes are used where flux and substantial rejection characteristics are required, e.g., in the purification of water. Various materials and chemical additives have been added during formation of the discrimination layer of the membranes to increase flux without reducing rejection characteristics. For example, U.S. Pat. No. 6,024,873 describes adding alcohols or ethers to the aqueous or organic phase before interfacial polycondensation to form the discrimination layer in order to increase water flux of the membrane. U.S. Pat. No. 8,177,978 teaches that diketonates and metal additives can be added to the aqueous or organic phases before interfacial polycondensation to form the discrimination layer in order to increase water flux. Other additives are described in U.S. Pat. Nos. 8,567,612; 8,801,935; and 8,029,857.

There are methods that purportedly improve the water flux of membranes by treating the membrane after formation of the discrimination layer. For example, U.S. Pat. No. 4,888,116 describes treating reverse osmosis membrane having a polyamide discrimination layer with an aqueous solution of a reagent that reacts with primary amine groups to form diazonium salt groups or derivatives of diazonium salt groups, which can increase the water flux of the polyamide membrane with purportedly little or no effect on the salt rejection of the membrane. U.S. Pat. No. 3,551,331 describes a process for modifying the permeability of a polyamide membrane by treatment with a protonic acid, lyotropic salt or a Lewis acid. U.S. Pat. No. 3,904,519 describes treatment of linear aromatic polyamides with crosslinking reagents to improve flux or flux stability of the resulting membranes.

The treatment of TFC membranes with chlorine or a chlorine generating agent to enhance their performance is disclosed in a number of patents. U.S. Pat. No. 4,277,344 describes the post-treatment of a polyamide membrane with a solution containing 100 ppm hypochlorite for one day. U.S. Pat. No. 4,761,234 describes the treatment of a polyamide TFC membrane that includes a triamino-benzene as one monomer with an aqueous solution containing 1000 ppm residual chlorine at a pH of 10.3 at room temperature for 18 hours. U.S. Pat. No. 5,051,178 describes the treatment of certain types of polyamide TFC membranes obtained by interfacial polymerization involving mixtures of triamines with 100-600 ppm chlorine or a chlorine generating agent at a pH of 6-13 for a time period of from 2 minutes to 45 hours. These patents demonstrate that treatment of a membrane with an agent releasing chlorine may improve the water flux of a polyamide membrane, but the improvement in water flux is generally at the cost of some other performance characteristic of the membrane, such as stability or salt rejection. U.S. Pat. No. 5,876,602 purportedly addresses these shortcomings by treating a composite polyamide reverse osmosis membrane with hypochlorite ion at a concentration of 200 to 10,000 ppm at a pH of at least 10.5 and an exposure time of from 30 minutes to 3 hours to improve water flux and salt rejection, as well as to increase the stability to alkaline conditions.

Some of the suggested methods in the art are too cost prohibitive to implement commercially. In others, the reactions can be difficult to control under production conditions, or can damage the membrane or processing equipment, or the improvements in the membrane can be transitory, or the treatments can result in increased water flux while sacrificing salt rejection over time.

Although many commercial polyamide membranes can display an excellent combination of water flux, salt rejection and chemical stability, membranes having improved performance characteristics are still being actively sought. What are needed are additional techniques for treating the membrane after formation of the discrimination layer that result in improved water flux while maintaining or improving rejection characteristics of TFC membranes.

SUMMARY OF THE INVENTION

Accordingly, the present invention is directed to post-production treatment processes for TFC membranes, particularly RO membranes, to enhance flux of the membranes while maintaining salt rejection, and to substantially obviate one or more of the problems due to limitations and disadvantages of the related art.

In one aspect, processes for the production of TFC membranes having increased flux are provided, where the process includes treating a TFC membrane with an oxidizing solution containing an oxidizing agent to react with the membrane to form a treated membrane, followed by a quenching step that includes contacting the treated membrane with a reducing solution containing a reducing agent, where the reducing agent can neutralize the oxidizing agent and thereby preventing it from continuing to react with the membrane. The salt rejection of the treated membrane generally is substantially the same as, or better than, an untreated membrane. In some embodiments, any one or a combination of chlorine, hypochlorous acid, or hypochlorite ion is present in the oxidizing solution, and an alkali-metal meta-bisulfite is present in the reducing solution.

Also provided are processes to improve water flux of a TFC membrane containing a polyamide discrimination layer, the method including the steps of treating the TFC membrane with an oxidizing solution containing an oxidizing agent in an amount of from about 7 ppm to about 35 ppm at a pH of about 10.4 or less for a period of time of at least 5 minutes to react with the polyamide discrimination layer to form a treated membrane; and contacting the treated membrane with a reducing solution containing a reducing agent at a pH from about 4 to about 8 for a time of at least 1 minute, where there is a close temporal connection between the steps of treating with an oxidizing agent and treating with a reducing agent. The amount of time between the end of the time period of treating the membrane with the oxidizing agent and contacting the oxidized membrane with the reducing agent is generally 60 minutes or less. There can be one or more than one washing step between treatment of the membrane with an oxidizing agent and treatment with a reducing agent. The washing step(s) can include contacting the treated membrane with water, such as deionized water or RO water.

The reducing agent can neutralize the oxidizing agent and thereby prevent the oxidizing agent from continuing to react with the polyamide discrimination layer. The oxidizing solution can include molecular chlorine, hypochlorous acid, or hypochlorite ion or a combination thereof. The reducing solution can include an antichlor. The reducing solution can include an alkali-metal meta-bisulfite. The oxidizing solution can include free chlorine and the reducing solution can include an antichlor. The oxidizing solution can include free chlorine in an amount from about 7 ppm to about 35 ppm and the reducing solution can include an antichlor in an amount from about 0.1 wt % to about 5 wt %. The antichlor can be an alkali-metal bisulfite, an alkaline-earth-metal bisulfite, an alkali-metal meta-bisulfite, an alkali-metal thiosulfate, an alkaline-earth-metal thiosulfate, or hydrogen peroxide or any combination thereof.

Also provided are RO membranes prepared according to the processes provided herein. The RO membranes exhibit a water flux greater than the water flux of an untreated TFC membrane. Also provided are reverse osmosis modules that include a reverse osmosis membrane prepared according to the processes provided herein, spirally wound around a central perforated tube. Also provided are reverse osmosis modules that include a reverse osmosis membrane prepared according to the processes provided herein, formed as hollow fibers and potted into hollow fiber modules. Also provided are method of purifying water, such as tap water, brackish water or seawater, the method comprising contacting the water with a reverse osmosis membrane prepared according to the processes provided herein, or contacting the water with module containing a reverse osmosis membrane prepared according to the processes provided herein.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION

A. Definitions

Figure 1A:
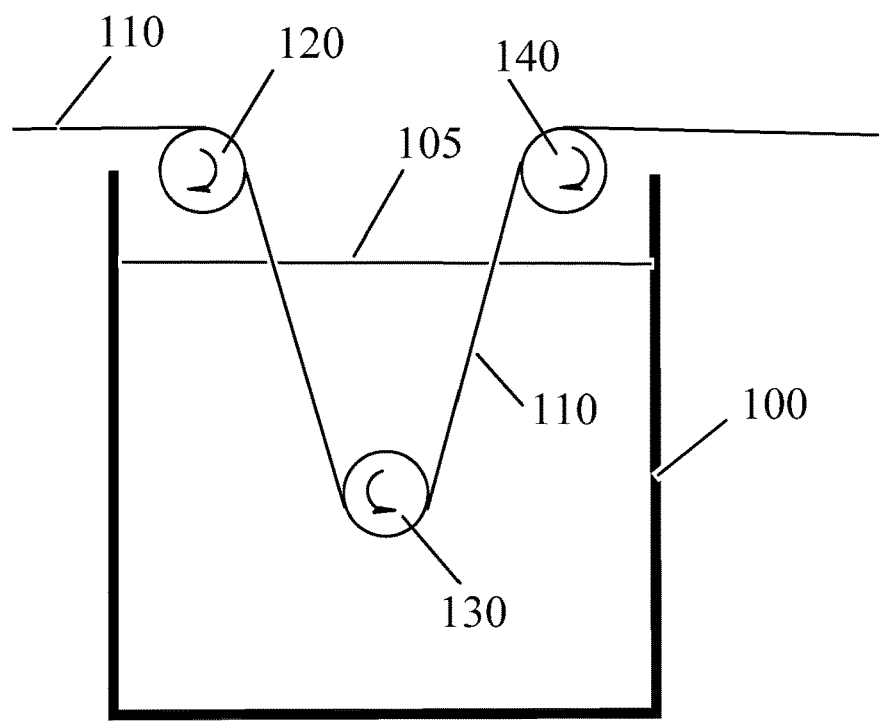
FIG. 1A is a diagram of an exemplary embodiment of a reaction tank containing one submerged guiding roller.

Unless defined otherwise, all technical and scientific terms used herein have the same meaning as is commonly understood by one of skill in the art to which the inventions belong. All patents, patent applications, published applications and publications, websites and other published materials referred to throughout the entire disclosure herein, unless noted otherwise, are incorporated by reference in their entirety. In the event that there are a plurality of definitions for terms herein, those in this section prevail.

As used here, the singular forms "a," "an" and "the" include plural referents unless the context clearly dictates otherwise.

As used herein, ranges and amounts can be expressed as "about" a particular value or range. "About" also includes the exact amount. Hence "about 5 percent" means "about 5 percent" and also "5 percent." "About" means within typical experimental error for the application or purpose intended.

As used herein, "optional" or "optionally" means that the subsequently described event or circumstance does or does not occur, and that the description includes instances where said event or circumstance occurs and instances where it does not. For example, an optional component in a system means that the component may be present or may not be present in the system.

As used herein, the term "alkyl" refers to a straight, branched, or cyclic chain containing at least one carbon atom and no double or triple bonds between carbon atoms.

As used herein, "flux" refers to liquid flow through a membrane.

As used herein, a "combination" refers to any association between two items or among more than two items. The association can be spatial or refer to the use of the two or more items for a common purpose.

As used herein, the term "surfactant" refers to molecules that absorb at the air/water, oil/water and/or oil/air interfaces, substantially reducing their surface energy. Surfactants generally are classified depending on the charge of the surface active moiety, and can be categorized as cationic, anionic, nonionic and amphoteric surfactants.

As used herein, a "thin film composite membrane" refers to a membrane that has layers of dissimilar materials joined together to form a single membrane.

As used herein, the term "contacting" refers to bringing two or more materials into close enough proximity whereby they can interact.

As used herein, "oxidation" refers to the loss of electrons from an atom.

As used herein, "oxidizing agent" refers to any agent or compound that extracts electrons from an atom. The oxidizing agent is reduced in the oxidation process.

As used herein, "reducing agent" refers to any agent or compound that is an electron donor or that contributes electrons to an atom. The reducing agent is oxidized in the reduction process.

As used herein, "quenching agent" refers to a reducing compound that can, either alone or in combination with another compound, react with or neutralize an oxidizing agent and thereby preventing it from continuing to react with a membrane.

As used herein, "free chlorine" refers to chlorine present in an aqueous solution as aqueous molecular chlorine, hypochlorous acid (HOCl) and or hypochlorite ion (OCl—). Free chlorine is chlorine that has not reacted with foreign substances other than water and is, therefore, available to oxidize substances.

As used herein, "combined chlorine" refers to the form of chlorine existing in water in chemical combination with ammonia or organic amines, in the form of chloramines, such as monochloramine ($NH_2Cl$), dichloramine ($NHCl_2$), and nitrogen trichloride ($NCl_3$).

As used herein, "total chlorine" refers to the sum of free chlorine and combined chlorine in an aqueous solution.

As used herein, a "chlorine scavenger" refers to a compound that reacts with chlorine, or with a chlorine-generating material, such as hypochlorite, to eliminate or reduce free chlorine.

As used herein, an "antichlor" refers to a substance that neutralize or decompose residual hypochlorite or chlorine in order to prevent ongoing reactions with the material that has been treated with hypochlorite or chlorine.

As used herein, "gfd" refers to gallons per square foot per day.

As used herein, "gpd" refers to gallons per day.

As used herein, a "close temporal connection" refers to a short duration of time, generally one hour or less.

B. Improvement of Water Flux

The use of TFC membranes for reverse osmosis (RO) is based on the ability of the membranes to selectively allow passage of certain components of the mixture, such as water, to be separated from other components, such as salt. In the purification of salt water, such as seawater or brackish water, the water is contacted with one surface of the discrimination layer of the RO TFC membrane under pressure to cause effective permeation of water through the membrane while minimizing the passage of the salt.

When casting TFC membranes using standard interfacial polymerization methods to form the polyamide discrimination layer of a thin film composite layer membrane, it is sometimes difficult to achieve a target water flux without sacrificing salt rejection. It has been determined that modifying the chemistry of the membrane surface after formation of the discrimination layer with an oxidizing agent followed by treatment with a reducing agent can be used to increase water flux while not effecting, or in some instances improving, salt rejection of the membrane.

Exposure of a polyamide membrane to an oxidizing agent, particularly long-term exposure to chlorine, is well known to cause degradation and failure of the membranes in the water purification processes. For example, water flux is reported to be reduced by anywhere from 10% to almost 50% after polyamide membranes are brought into contact with hypochlorite (e.g., see Kwon et al., J Membrane Science 282 (2006) 456-464), and the loss of the rejection and increase in the flux rate occur in an unrecoverable manner. This is particularly true in polyamide membranes that contain a number of different sites at which chlorine can react with the polymer. The degree to which polyamide membranes are attacked depends on the particular acids and amines employed in the formation of the polyamide. Kang et al. teaches that membrane deterioration was much worse when a polyamide membrane was treated with 60 ppm $NaClO^-$ at pH 4 than the deterioration observed when a polyamide membrane was treated with 1000 ppm $NaClO^-$ at pH 10 (Kang et al., J Membrane Science 300 (2007) 165-171).

When an oxidizing agent is added to the water used to wash the membrane after formation of the discrimination layer, the oxidizing agent can react with the polyamide and modify its structure. If the oxidizing agent reaction with the membrane is not controlled, it can result in degradation or destruction of the membrane. After exposing the membrane to the oxidizing agent to form a treated membrane, washing the treated membrane with water may not be sufficient to control the reaction of the oxidizing agent with the polyamide membrane, as any residual oxidizing agent or resulting free radicals can continue to react with the membrane. Over-oxidation of the membrane can result in loss of discrimination layer integrity, often manifested by initial loss of salt rejection.

Surprisingly it has been discovered that membranes treated with concentrations of free chlorine in the range of from about 5 ppm to about 40 ppm free chlorine at a pH in the range of from about 10 to about 11, or a range from about 10 to about 10.5, followed by a quenching step that includes exposing the treated membrane to a reducing agent, such as an alkali metal meta-bisulfite, exhibit much greater water flux and retain their salt rejection properties compared to untreated membranes. While chlorine as the oxidizing agent and an alkali metal meta-bisulfite as the reducing agent are described as an exemplary embodiment, other oxidizing agents and reducing agents can be used.

It is known in the art that sodium meta-bisulfite can be included at low levels as a preservative in modules (e.g., see U.S. Pat. No. 8,236,178). Sodium meta-bisulfite also can be used as a preservative for membranes prepared using the methods described herein. The treatment step with a reducing agent, which can include a meta bisulfite, differs from the use of sodium meta-bisulfite as a preservative because the reducing agent treatment step of the methods provided herein occurs in close temporal connection with treatment with the oxidizing agent. The addition of a preservative to a membrane or module generally occurs at the end of membrane or module formation, and often occurs hours or days after membrane or module formation. As shown in the Examples, such a delay in applying a reducing agent after applying an oxidizing agent can result in membrane damage. Membrane damage can manifest by decreases in salt rejection. Any membrane damage can become more evident after cleaning processes are performed, where the membrane can be subjected to extremes in pH (pH values can vary as low as pH 2 to as high as pH 13). Any membrane damage can decrease the useful life of the membrane, because the membrane can fail after fewer cleaning cycles. Accordingly, in the methods provided herein, generally only a short duration of time is allowed to lapse between application of the oxidizing agent and application of the reducing agent. A washing step can be included between the application of the oxidizing agent and application of the reducing agent. After treatment with the reducing agent, the reducing agent solution typically is removed, and the membrane washed with deionized or RO water, and then, if desired, the membrane can be treated with, and/or stored in, a solution containing a preservative. Typical preservatives include sodium meta-bisulfite, sodium hydrogen sulfite, citric acid, and lactic acid.

Oxidizing Agent

Any oxidizing agent that is functional in an aqueous or mostly aqueous environment can be used. Exemplary types of oxidizing agents are halogen-containing oxidizing agents and oxygen-containing oxidizing agents. Halogen-containing oxidizing agents include those that are characterized as being a source of free or elemental halogen, such as a source of free or elemental chlorine or bromine.

Non-limiting examples of chlorine sources include sodium hypochlorite, potassium hypochlorite, calcium hypochlorite, lithium hypochlorite, chlorine dioxide, chlorine gas, trichloroisocyanuric acid, sodium or potassium dichloro(iso)cyanurate, chlorinated trisodium phosphate, dichlorodimethylhydantoin, N-chlorosuccinimide, and chloroacetyl-urea, and any combination thereof. A preferred chlorine source is any of the alkali-metal hypochlorites or alkaline-earth-metal hypochlorites.

Non-limiting examples of bromine containing oxidizing agents includes 1-bromo-3-chloro-5,5-dimethylhydantoin and 1,3-dibromo-5,5-dimethyl-hydantoin. Non-limiting examples of oxygen containing oxidizing agents include ozone, hydrogen peroxide, sodium permanganate, sodium percarbonate, sodium perborate, sodium persulfate, and urea hydrogen peroxide and any combination thereof.

In the methods provided herein, a TFC membrane containing a polyamide discrimination layer can be treated with an oxidizing solution containing from at or about 1 ppm to at or about 50 ppm oxidizing agent. In some embodiments, the oxidizing solution is aqueous or contains water, and the amount of oxidizing agent present is 1 ppm, 2 ppm, 3 ppm, 4 ppm, 5 ppm, 6 ppm, 7 ppm, 8 ppm, 9 ppm, 10 ppm, 15 ppm, 20 ppm, 25 ppm, 30 ppm, 35 ppm, 40 ppm, 45 ppm or 50 ppm, or an amount in a range of at or about a to at or about b, where a is any one of the preceding ppm values of oxidizing agent, and b is any one of the preceding ppm values of oxidizing agent that is >a, such as from about 7 ppm to about 30 ppm, or from about 15 ppm to about 35 ppm, or from about 8 ppm to about 25 ppm, etc.

A preferred oxidizing agent is a source of free or elemental chlorine. In some embodiments, the TFC membrane containing a polyamide discrimination layer is treated with an aqueous solution containing from about 1 ppm to about 50 ppm free chlorine, or from about 5 ppm to about 40 ppm, or from about 7 ppm to about 30 ppm, or from about 15 to about 30 ppm free chlorine. In some embodiments, the chlorine source of the free chlorine is an alkali-metal hypochlorite or an alkaline-earth-metal hypochlorite.

Total chlorine concentration can be measured using any known technique, such as the DPD method using N,N-diethyl-p-phenylenediamine sulfate (Thermo Orion Method AC4P72 (2002)). Free chlorine can be measured using an indophenol method (see, e.g., Ward, *Chlorine Residual Measurement in Chloraminated Systems*, presented at the 76$^{th}$ Annual WIOA Victorian Water Industry Operations Conference and Exhibition, Bendigo Exhibition Center Sep. 3-5, 2013; and WO2009/155462).

The TFC membrane can be exposed to an oxidizing agent for a time of at least 5 minutes, or at least 10 minutes, or at least 15 minutes, or at least 20 minutes, or at least 25 minutes, or at least 30 minutes, or at least 35 minutes, or at least 40 minutes, or at least 45 minutes. The membrane can be exposed to an oxidizing agent for a time of 45 minutes or less, or 40 minutes or less, or 35 minutes or less, or 30 minutes or less, or 25 minutes or less, or 20 minutes or less, or 15 minutes or less, or 10 minutes or less, or 5 minutes or less. The TFC membrane containing a polyamide discrimination layer can be treated with an oxidizing agent for a period of time from about 5 minutes to about 90 minutes. In some instances, the exposure time of the membrane to the oxidizing agent is from about 10 minutes to about 60 minutes.

The oxidizing agent can be provided in an aqueous solution. The pH of the aqueous solution containing the oxidizing agent can be in the range of from about 8-11. In some applications, the pH is from about 10 to about 11. In some applications, the pH is from about 10 to about 10.5. In some applications, the pH is 10.4 or less, or from about pH 9 to about pH 10.4.

The membrane can be exposed to the oxidizing agent at any temperature. The exposure temperature can be in a range from about 4° C. to about 40° C. The exposure temperature can be ambient temperature, such as from about 20° C. to about 26° C. In some applications, the exposure temperature is about 25° C.

The membrane can be exposed to the oxidizing agent at any pressure. The exposure pressure can be ambient pressure, such as from about 0.98 atmosphere (atm) to about 1 atm, or from about 101.32 kPa to about 101.325 kPa, or from about 14.4 psi to about 14.7 psi. The membrane can be exposed to the oxidizing agent at an elevated pressure. The exposure pressure can be, e.g., from at or about 25 psi to at or about 150 psi, e.g., 125 psi.

Close Temporal Connection of Treatment

The treatment of the membrane with an oxidizing agent is followed in close temporal connection with treatment with a reducing agent. After exposure of the membrane to the oxidizing agent, the oxidized membrane is treated within a short duration of time with a reducing agent. Generally, the amount of time between the end of the period of exposure of the membrane to the oxidizing agent, and beginning the exposure of the oxidized membrane to a reducing agent, is 60 minutes or less. The amount of time between the end of the period of exposure of the membrane to the oxidizing agent and the exposure of the oxidized membrane to a reducing agent can be up to 60 minutes, or up to 55 minutes, or up to 50 minutes, or up to 45 minutes, or up to 40 minutes, or up to 35 minutes, or up to 30 minutes, or up to 25 minutes, or up to 20 minutes, or up to 15 minutes, or up to 10 minutes, or up to 5 minutes. The amount of time between the end of the period of exposure of the membrane to the oxidizing agent and the exposure of the oxidized membrane to a reducing agent can be from 30 seconds up to about 60 minutes. When a higher amount of oxidizing agent is used, a lower amount of time between the end of the period of exposure of the membrane to the oxidizing agent and the exposure of the oxidized membrane to a reducing agent can be selected.

The oxidized membrane can be subjected to a washing step or multiple washing steps prior to treatment with the reducing agent. The washing steps can include washing with deionized or RO water. A washing step can be of any duration of time within the short duration of time between the end of the treatment with the oxidizing agent and beginning of the treatment with the reducing agent. A washing step can be for a period of time of at least 1 minute, or at least 2 minutes, or at least 5 minutes. The washing step can be performed for a period of time of about 60 minutes or less, or about 45 minutes or less, or about 30 minutes or less, or about 15 minutes or less, or about 5 minutes or less. The washed membrane can be allowed to be exposed to the air for a period of time between washing steps. For example, the oxidized membrane can be washed with deionized water for 5 minutes, followed by a period of air drying of 10 minutes or less, followed by a washing step with deionized water for 5 minutes, followed by treatment with a reducing agent. The membrane can be within a module during treatment, and the washing steps can include applying pressure to drive deionized or RO water through the module for a period of time, optionally followed by a period of time when no pressure is applied to the module, followed by either application of pressure to drive deionized water as a subsequent washing step or to drive a solution containing a reducing agent through the module.

Reducing Agent

After the membrane has been treated with the oxidizing agent to form an oxidized membrane, the membrane is treated with a reducing agent. The oxidized membrane can be washed with water prior to exposing the membrane to a solution containing a reducing agent. A reducing agent generally is selected to neutralize any residual oxidizing agent. Non-limiting examples of reducing agents include ammonium sulfite, alkali-metal sulfite, alkaline-earth-metal sulfite, zinc sulfite, ammonium bisulfite, alkali-metal bisulfite, alkaline-earth-metal bisulfite, sodium dithionate, zinc dithionate, alkali-metal meta-bisulfite, acetone sodium bisulfite, alkylamine bisulfite; alkali-metal thiosulfate, alkaline-earth-metal thiosulfate, alkali metal borohydrides, alkali earth metal borohydrides, alkali metal aluminum hydrides, di alkyl aluminum hydrides, ammonium hypophosphite, alkali-metal hypophosphite, alkaline-earth-metal hypophosphite, ammonium phosphite, alkali-metal phosphite, alkaline-earth-metal phosphite thiosalicylic acid, lithium aluminum isopropoxide, 2-pyridinethione, dithiothreitol, L-ascorbic acid, thiourea dioxide, and combinations thereof. Preferred reducing agents include ammonium sulfite, alkali-metal sulfites, alkaline-earth-metal sulfites, zinc sulfite, ammonium bisulfite, alkali-metal bisulfites, alkaline-earth-metal bisulfites, sodium dithionate, zinc dithionate, and alkali-metal meta-bisulfites and combinations thereof.

When the oxidizing agent is or includes a source of free or elemental chlorine, the reducing agent can be selected to be or include a chlorine scavenger. Non-limiting examples of chlorine scavengers include compounds that contain a reducing anion, such as sulfite, bisulfite, thiosulfate, and nitrite, and antioxidants such as ascorbate, carbamate, phenols; and mixtures thereof. Any chlorine scavengers can be used to treat the oxidized/treated membrane treated with free or elemental chlorine.

When the oxidizing agent is or includes a source of free or elemental chlorine, the reducing agent can be selected to be or include an antichlor. Non-limiting examples of antichlors include alkali-metal bisulfites, alkaline-earth-metal bisulfites, alkali-metal meta-bisulfites, alkali-metal thiosulfates, alkaline-earth-metal thiosulfates, and hydrogen peroxide.

In the methods provided herein, a TFC membrane containing a polyamide discrimination layer can be treated with a reducing solution containing an amount of reducing agent that is in excess of the amount of oxidizing agent used. The reducing solution can contain an amount of reducing agent from at or about 0.05 wt % to at or about 5 wt % reducing agent. In some embodiments, the reducing solution is aqueous or contains water, and the amount of reducing agent present is 0.05 wt %, 0.1 wt %, 0.2 wt %, 0.3 wt %, 0.4 wt %, 0.5 wt %, 0.6 wt %, 0.7 wt %, 0.8 wt %, 0.9 wt %, 1 wt %, 1.25 wt %, 1.5 wt %, 1.75 wt %, 2 wt %, 2.25 wt %, 2.5 wt %, 2.75 wt %, 3 wt %, 3.25 wt %, 3.5 wt %, 3.75 wt %, 4 wt %, 4.25 wt %, 4.5 wt %, 4.75 wt %, or 5 wt %, or an amount in a range of at or about c to at or about d, where c is any one of the preceding wt % values of reducing agent, and d is any one of the preceding wt % values of reducing agent that is >c, such as from about 0.3 wt % to about 3 wt %, or from about 0.05 wt % to about 1 wt %, or from about 0.2 wt % to about 0.9 wt %, etc.

The amount of reducing agent generally is in an amount in excess of the amount of oxidizing agent used. In some embodiments, the amount of reducing agent is in excess of the amount of oxidizing agent used in a ratio of from about 50 to 500 parts reducing agent to 1 part oxidizing agent, such as a ratio of 500:1, or 400:1, or 333:1, 300:1, or 200:1, or 100:1, or 90:1, or 80:1, or 70:1, or 60:1, or 50:1.

The appropriate pH of the reducing solution can be selected by one skilled in the art based on the reducing agent selected. For example, the pH of the reducing solution can be in the range from about 3.5 to about 8. In some applications, the reducing solution can have a pH from about 3.5 to about 5.5. In some applications, the reducing solution can have a pH from about 4 to about 6. In some applications, the reducing solution can have a pH of about 7.5 or less. In some applications, the reducing solution can have a pH of about 6.5 or less. In some applications, the reducing solution can have a pH of about 5.5 or less. In some applications, the reducing solution can have a pH of about 4.5 or less.

When the oxidizing agent is a source of free or elemental chlorine, the amount of reducing agent can be selected so that the total chlorine concentration is reduced to a level that is less than about 0.5 ppm, or from about 0 ppm to about 0.5 ppm, or from about 0 ppm and about 0.1 ppm.

The TFC membrane can be exposed to the reducing agent for a time of at least 1 minute, at least 5 minutes, or at least 10 minutes, or at least 15 minutes, or at least 20 minutes, or at least 25 minutes, or at least 30 minutes. The membrane can be exposed to an oxidizing agent for a time of 60 minutes or less, or 55 minutes or less, or 50 minutes or less, or 45 minutes or less, or 40 minutes or less, or 35 minutes or less, or 30 minutes or less, or 25 minutes or less, or 20 minutes or less, or 15 minutes or less, or 10 minutes or less, or 5 minutes or less. The TFC membrane containing a polyamide discrimination layer can be treated with a reducing agent for a period of time from about 1 minute to about 60 minutes. In some instances, the exposure time of the membrane to the reducing agent is from about 2 minutes to about 30 minutes.

The membrane can be exposed to the reducing agent at any temperature. The exposure temperature can be in a range from about 4° C. to about 40° C. The exposure temperature can be ambient temperature, such as from about 20° C. to about 26° C. In some applications, the exposure temperature is about 25° C.

The membrane can be exposed to the reducing agent at any pressure. The exposure pressure can be ambient pressure, such as from about 0.98 atmosphere (atm) to about 1 atm, or from about 101.32 kPa to about 101.325 kPa, or from about 14.4 psi to about 14.7 psi. The membrane can be exposed to the reducing agent at an elevated pressure. The exposure pressure can be from, e.g., at or about 25 psi to at or about 150 psi, e.g., 125 psi. The exposure pressure can be from, e.g., about 180 to about 225 psi. The exposure pressure can be about 600 psi or less.

B. Preparation of TFC Membranes

TFC membranes can be used in nanofiltration, reverse osmosis (RO) and forward osmosis (FO) applications. For RO applications, the membranes include at least one discrimination layer (front side) and a support layer (back side) in planer arrangement with each other to form a composite structure. The support layer is not particularly limited but preferably includes a porous non-woven fabric or fibrous web mat including fibers that can be orientated. Alternatively, a woven fabric can be used. Representative examples of support layers are described in U.S. Pat. Nos. 4,214,994; 4,795,559; 5,435,957; 5,919,026; 6,156,680; and 7,048,855; and U.S. Pat. Pub. Nos. US 2008/0295951 and US 2010/0193428. In some embodiments, the support layer can be provided as a roll of sheet material upon which a membrane layer is applied The support layer can by hydrophilic or hydrophobic. In some applications, the support layer is hydrophilic. The TFC membrane also includes at least one a discrimination layer on a surface of the support layer. The TFC membrane can include an anti-fouling layer deposited on either or both surfaces of the TFC membrane. The TFC membrane also can include a protective layer deposited on either or both surfaces of the TFC membrane or on an anti-fouling layer. For example, to prevent scratching of the membrane surface or alter adsorption, a hydrophilic polymer layer can be applied to the surface of the discrimination layer or the anti-fouling layer. For example, a solution of polyvinyl alcohol in water can be applied to the surface of the discrimination layer followed by application of heat to provide a heat cure of the hydrophilic polymer layer.

1. Support Layer

The support layer typically includes a polymeric microporous support membrane, which in turn is often supported by a non-woven or woven mesh fabric to improve handling properties of the membranes or for mechanical strength or both. The support layer can include a polysulfone or other suitably porous membrane, such as a membrane containing polyethersulfone, poly(ether sulfone ketone), poly(ether ethyl ketone), poly(phthalazinone ether sulfone ketone), polyacrylonitrile, polyvinyl chloride, polyester, polystyrene, polysulfone, polypropylene, cellulose nitrate, cellulose acetate, cellulose diacetate, or cellulose triacetate. The support layer typically is about 25 to 250 microns in thickness. The support layer is porous, and often the smallest pores of the support layer are located very near the upper surface. Porosity at the surface can be low, for instance from 5-15%, of the total surface area.

The preparation of the support layer can include spraying or casting a polymer solution onto a woven or non-woven fabric layer. Exemplary processes known in the art to form the support layer are disclosed, e.g., in U.S. Pat. Nos. 3,926,798; 4,039,440; 4,337,154; and 8,177,978; and in U.S. Patent Application Publication Nos. 2011/0174728 and 2014/0014575, the disclosure of each of which is incorporated herein by reference. One or more than one reinforcing fabric layer of a woven or non-woven material or a combination thereof, and made up of polymeric fibers, can be included in the TFC membrane. When present, the fabric layer preferably is permeable to water, flat, and without stray fibers that could penetrate the support layer or the discrimination layer. The fabric layer generally is thin to decrease cost and to maximize membrane area, is resistant to extensional forces, and is mechanically resistant to deformation at high pressures.

The preparation of the support layer generally includes the addition of N-methylpyrrolidone (NMP) solvent (Acros Organics, Waltham, Mass., USA) to a polysulfone polymer ($M_n$-26,000 from Aldrich, USA) ($M_n$ being the number average molecular weight) in transparent bead form in airtight glass bottles. Alternatively dimethylformamide (DMF) can be used as the solvent. The mixture then can be agitated for several hours until complete dissolution of the polysulfone polymer is achieved, forming a dope or casting solution. The casting solution can be cast or spread over a woven or non-woven mesh fabric layer, which optionally can be attached to glass plate via a knife-edge. In some embodiments, the glass plate with the mesh fabric layer and casting solution can be immediately immersed into demineralized water, which has been maintained at the desired temperature (such as from about 15° C. to about 30° C.). Immediately, phase inversion begins and after several minutes, the woven or non-woven fabric layer supporting the polysulfone membrane can be separated from the glass plate to form the support layer. The support layer then can be washed thoroughly with deionized water and stored in cold conditions until used. In a continuous coating process for production of a support layer, a glass plate would not be required. The porous support layer typically can be kept wet until use.

2. Discrimination Layer

At least one discrimination layer comprising a polyamide is formed on a surface of the support layer, thereby forming a thin film composite membrane. The discrimination layer can be synthesized using an interfacial polymerization process on the porous support membrane. In the synthesis of the discrimination layer, two immiscible solvents generally are used, usually an aqueous phase and an organic phase solution, so that a monomer in one solvent reacts with a monomer in the other solvent to polymerize and form the discrimination layer. The polymerization reactions are very fast and relatively high molecular weight polymers are obtained.

The discrimination layer is a permeable membrane containing any material as long as the discrimination layer allows filtration of a fluid for which filtration is desired. In an exemplary embodiment, the discrimination can be a polyamide layer. The chemistry of the discrimination layer is not to be viewed as limited. In an exemplary embodiment, the polyamide layer can be formed by interfacial polymerization of a polar solution and a non-polar solution. An exemplary polar solution can be an aqueous phase containing a polyamine such as m-phenylenediamine (MPD). An exemplary non-polar solution can be an organic phase containing a polyfunctional acid halide such as trimesoyl chloride (TMC). A discrimination layer can be formed using any of the methods and chemistries of manufacturing discrimination layers that are disclosed in any one of U.S. Pat. Nos. 4,277,344; 4,902,424; 5,108,607; 5,543,046; 6,337,018; 7,109,140; and 8,177,978, each of which is incorporated by reference herein in its entirety.

In some embodiments, the discrimination layer generally contains a polyamide formed by the interfacial polymerization between one or more di- or polyfunctional amines and one or more di- or polyfunctional acyl chlorides. The di- or polyfunctional amines can be aromatic and/or aliphatic. The di- or polyfunctional acyl chlorides can be aromatic and/or aliphatic.

Generally, the polymer matrix that forms the discrimination layer can be prepared by reaction of two or more monomers. The first monomer can be a dinucleophilic or a polynucleophilic monomer and the second monomer can be a dielectrophilic or a polyelectrophilic monomer. That is, each monomer can have two or more reactive (e.g., nucleophilic or electrophilic) groups. Both nucleophiles and electrophiles are well known in the art, and one of skill in the art can select suitable monomers for this use. The first and second monomers can also be chosen so as to be capable of undergoing an interfacial polymerization reaction to form a polymer matrix (i.e., a three-dimensional polymer network) when brought into contact. The first and second monomers also can be selected so as to be capable of undergoing a polymerization reaction when brought into contact to form a polymer product that is capable of subsequent crosslinking by, e.g., exposure to heat, light radiation, or a chemical crosslinking agent.

The first monomer can be selected so as to be soluble in a polar liquid, preferably water, to form a polar mixture. Generally, the difunctional or polyfunctional nucleophilic monomer can have primary or secondary amino groups and can be aromatic (e.g., a diaminobenzene, a triaminobenzene, m-phenylenediamine, p-phenylenediamine, 1,3,5-triaminobenzene, 1,3,4-triaminobenzene, 3,5-diamino-benzoic acid, 2,4-diamino-toluene, 2,4-diaminoanisole, and xylylenediamine) or aliphatic (e.g., ethylenediamine, propylenediamine, piperazine, and tris(2-diamino-ethyl) amine). In a yet further example, the polar liquid and the first monomer can be the same compound; that is, the first monomer can provided and not dissolved in a separate polar liquid.

Examples of suitable amine species include primary aromatic amines having two or three amino groups, e.g., m-phenylene diamine, and secondary aliphatic amines having two amino groups, for example piperazine. The amine can typically be applied to the microporous support as a solution in a polar liquid, e.g., water. The resulting polar mixture typically includes from about 0.1 wt % to about 20 wt %, preferably from about 0.5 wt % to about 6 wt %, amine. Once coated on a porous support layer, excess polar mixture optionally can be removed. The polar mixture need not be aqueous, but the polar liquid should be immiscible with the apolar liquid. Although water is a preferred solvent, non-aqueous polar solvents can be used, such as acetonitrile and dimethylformamide (DMF).

The polar mixture typically can be applied to the porous support layer by dipping, immersing, coating, spraying or any other application techniques. Once coated on the porous support layer, excess polar mixture optionally can be removed by evaporation, drainage, air knife, rubber wiper blade, nip roller, sponge, or other devices or processes.

The method of forming the discrimination layer on a surface of the porous support layer can include floating the porous support layer on the surface of the aqueous phase, or casting the aqueous phase on a surface of the porous support layer; or spraying the aqueous phase onto a surface of the porous support layer; or immersing the porous support layer in the aqueous phase. In methods that include floating or immersing the porous support in the aqueous phase, the treating time can be varied very widely in a range of from about 1 second to about 24 hours or longer, but such treating time is not critical. The treatment effected once is usually sufficient, but the treatment can be performed twice or more.

Representative conditions for reaction of an amine (e.g., MPD) with an electrophile (e.g., TMC) to form a polyamide thin film composite membrane, include use of a ratio of concentration of MPD to concentration of TMC in the range of from about 10:1 to about 20:1, with the MPD concentration being from about 1 wt % to about 6 wt % of the polar phase (aqueous phase). In some embodiments, the ratio of concentration of MPD to concentration of TMC is about 10:1, or about 11:1, or about 12:1, or about 13:1, or about 14:1, or about 15:1, or about 16:1, or about 17:1, or about 18:1, or about 19:1, or about 20:1. The polymerization reaction can be carried out at room temperature in an open environment, or the temperature of either the polar or the apolar liquid, or both, can be modulated or controlled, e.g., at a temperature above room temperature (20° C. to 25° C.) or a temperature below room temperature. Once formed, the discrimination layer can act as a barrier to inhibit contact between the reactants and to slow the reaction. The discrimination layer typically is very thin and permeable to water, but relatively impermeable to dissolved, dispersed, or suspended solids, such as salts to be removed from saltwater or brackish water and thus in use can produce purified water.

In some embodiments, a second monomer can be selected so as to be miscible with the apolar (organic phase) liquid forming an apolar mixture, although for monomers having sufficient vapor pressure, the monomer optionally can be delivered from a vapor phase. The second monomer optionally also can be selected so as to be immiscible with a polar liquid. Typically, the second monomer can be a dielectrophilic or a polyelectrophilic monomer. The electrophilic monomer can be aromatic in nature and can contain two or more, for example three, electrophilic groups per molecule. The second monomer can be a trimesoyl halide. For the case of acyl halide electrophilic monomers, acyl chlorides are generally more suitable than the corresponding bromides or iodides because of the relatively lower cost and greater availability.

Suitable polyfunctional acyl halides include trimesoyl chloride (TMC), trimellitic acid chloride, isophthaloyl chloride, terephthaloyl chloride and similar compounds or blends of suitable acyl halides. As a further example, the second monomer can be a phthaloyl halide.

The polyfunctional acyl halide can be dissolved in the apolar organic liquid in a range of, for example, from about 0.01 wt % to about 10.0 wt %, or from about 0.03 wt % to about 3 wt % or from about 0.05 wt % to about 5 wt %. Suitable apolar liquids are capable of dissolving the electrophilic monomers (e.g., polyfunctional acyl halides) and are immiscible with a polar liquid (e.g., water). Generally the apolar organic liquid is a water-immiscible solvent that is inactive in the interfacial polymerization, does not form a chemical bond with the halide compound, and does not damage the porous support layer Exemplary apolar organic liquids that can be used to dissolve the acyl halide include aliphatic hydrocarbons, such as $C_8$-$C_{24}$ hydrocarbons and mixtures thereof, such as isoparaffinic solvents such as Isopar™ isoparafinnic fluids (e.g., Isopar™ G petroleum naphtha, low odor, low aromatic $C_{10}$-$C_{12}$ isoalkanes solvent, ExxonMobil, Irving, Tex.) and Isane® isoparaffinic solvents (Total Special Fluids, Oudalle, France). The solvent used can be a single solvent or a mixture of solvents.

Additional apolar liquids can be included in the organic phase. For example, an apolar liquid that does not pose a threat to the ozone layer and yet are sufficiently safe in terms of their flashpoints and flammability to undergo routine processing without having to undertake extreme precautions can be selected. These can include $C_5$-$C_7$ hydrocarbons and higher boiling point hydrocarbons and aromatics, i.e., those with boiling points greater than about 90° C., such as $C_8$-$C_{24}$ hydrocarbons and mixtures thereof, which have more suitable flashpoints than their $C_5$-$C_7$ counterparts, but are less volatile. Exemplary apolar liquids that can be included in the organic phase include trimethyl benzenes, such as 1,2,3-trimethylbenzene, 1,2,4-trimethylbenzene, and 1,3,5-trimethylbenzene; tetra-methyl-benzenes, such as 1,2,3,4-tetramethylbenzene, 1,2,4,5-tetramethylbenzene and 1,3,4,5-tetramethylbenzene; pentamethylbenzene, hexamethylbenzene, di-isopropyl-benzenes, tri-isopropyl-benzenes, and tetra-isopropyl-benzene. In some embodiments, the organic phase includes polyfunctional acyl halide and 1,3,5-trimethylbenzene.

The apolar mixture typically can be applied by dipping, immersing, coating, spraying or any other application technique.

In some embodiments, the polyfunctional acyl halide monomer (also referred to as acid halide) is coated on the porous support layer, typically by application of the organic phase solution. Amine solution is typically coated first on the porous support followed by the acyl halide solution. The monomers can react when in contact, thereby polymerizing to produce a polymer (e.g., polyamide) matrix discrimination layer at the upper surface of the support layer. Although one or both of the polyfunctional amine and acyl halide layers can be applied to the porous support layer from a solution, such as by application of the aqueous and organic phases discussed above, they can alternatively be applied by other means, such as by vapor deposition, or heat.

It can be advantageous to store the support layer for a period of time, e.g., from 1 minute for up to one hour, before interfacial polymerization on the support layer between aqueous and organic phase solutions. In some embodiments, the discrimination layer can be formed by applying the organic phase solution to the support layer and, after at least 10 seconds, preferably 2 minutes and more preferably 5 minutes after the organic phase solution was applied, applying the aqueous phase to the organic phase solution on the support layer. In some embodiments, the discrimination layer can be formed by applying the aqueous phase to the support layer, allowing it to dry, and then applying the organic phase solution to the dried aqueous phase on the support layer.

Practice of the invention does not depend critically on the overall shape of the thin film composite membrane. Flat sheet and hollow fiber configurations are two of the possibilities for this overall shape. For flat sheet membranes, a discrimination layer can be on the top surface, the bottom surface, or on both surfaces of the support layer. For hollow fiber membranes, a discrimination layer can be on the inner surface of the support layer, the outer surface of the support layer, or on both inner and outer surfaces of the support layer.

C. Modules

The TFC membranes produced using the processes described herein can be spirally wound around a central porous permeate collection tube to produce a semipermeable membrane module for use in a pressure vessel. Representative examples of spiral wound filtration modules, corresponding fabrication techniques and modes of operation are described in: U.S. Pat. Nos. 4,842,736; 5,096,584; 5,114,582; 5,147,541; 5,538,642; 5,681,467; 6,277,282; and 6,881,336; and U.S. Pat. Pub. Nos. US 2007/0272628 and US 2008/0295951. The module includes at least one membrane envelope concentrically wound about a permeate collection tube. The membrane envelope is preferably formed from one or more membrane sheets which are sealed about a portion of their periphery. An edge of the membrane envelope is axially aligned along a permeate collection tube such that the membrane envelope is in fluid communication with the permeate collection tube but is otherwise sealed from feed fluid passing across the outer surface of the membrane envelope.

A typical spirally wound semipermeable membrane module includes a plurality of leaves that are individual envelopes of sheet-like semipermeable membrane material that sandwich therebetween a layer of porous permeate carrying material, such as polyester fibrous sheet material. The semipermeable membrane material includes the membranes produced using the processes described herein.

Interleaved between adjacent leaves generally are lengths of spacer material, which may be woven or non-woven or other open mesh, screen-like crosswise designs of synthetic filaments, e.g. cross-extruded filaments of polypropylene, that provide flow passageways for the feed water being pumped from end to end through the pressure vessel. An appropriate lay-up of such alternating leaves and spacer sheets is then spirally wound about a hollow tube having a porous sidewall to create a right circular cylindrical module.

Modules containing membranes produced using the processes described herein can be used to produce a stream of potable water from brackish water at relatively low pressure conditions, i.e. not greater than about 225 psi, and in some embodiments at pressures of about 150 psi or less. These low pressure conditions can permit the use of pressure vessels, pumps, valves, and piping having a more moderate pressure rating than usually require for reverse osmosis systems and to thereby avoid the cost of expensive high pressure RO systems. This substantially reduces not only initial capital costs but operating costs as well, compared to standard high pressure seawater desalination systems. Capital costs can be significantly reduced because operating pressures are about one-half to about two-thirds of those used in conventional seawater desalinization systems and pressure vessels rated for a pressure of about 225 psi or below can be used, avoiding the costs associated with design and fabrication of high pressure vessels. In addition, because the operating pressure is lower than that required for conventional seawater RO desalinization installations, the power costs are lower.

As an alternative to preparing the membranes in flat-sheet form, the membranes can be formed as hollow fibers, as is known in the art. Hollow fiber membranes can be potted into hollow fiber modules (e.g., see U.S. Pat. Nos. 5,032,268; 5,160,673; 5,183,566; 5,484,528; and 8,551,388 and U.S. Pat. Appl. Pub. Nos. 2011/0031180 and 2015/0107455).

D. Post-Formation Treatment

Once the TFC membrane containing a polyamide discrimination layer is formed, is can be subjected to post-formation treatment with an oxidizing agent and a reducing agent. The TFC membrane can be cut into coupons and the coupons can be subjected to the post-formation treatment. The TFC membrane can be treated on a process line, e.g., in a batch process or a continuous process. The TFC membrane also can be subjected to the post-formation treatment while in a module, and can be treated within a pressure vessel.

Treatment of Coupons

Coupons having the desired dimensions can be cut from the TFC reverse osmosis membrane. The coupons then can be immersed in bath containing an oxidizing solution that includes an oxidizing agent in an amount from about 1 ppm to at or about 50 ppm oxidizing agent. In some embodiments, the oxidizing solution is aqueous or contains water. An exemplary oxidizing agent is an alkali-metal hypochlorite or alkaline-earth-metal hypochlorite in an amount from about 7 ppm to about 30 ppm. The pH of the oxidizing solution can be in the range of 10 to 11, or from about pH 10 to about pH 10.5, or a pH of 10.4 or less. The temperature of the oxidizing solution can be in the range of from about 5° C. to about 40° C. A preferred exposure temperature is ambient temperature, such as from about 20° C. to about 26° C. The membrane can be exposed to the oxidizing agent at any pressure. In an open tank, the exposure pressure can be ambient pressure, such as from about 0.98 atmosphere (atm) to about 1 atm, or from about 101.32 kPa to about 101.325 kPa, or from about 14.4 psi to about 14.7 psi. In a closed tank that can be pressurized, the membrane can be exposed to the oxidizing agent at an elevated pressure. The exposure pressure can be, e.g., from at or about 25 psi to at or about 150 psi, e.g., 125 psi. The coupon can be exposed to the oxidizing solution for a time period of from about 5 minutes to about 90 minutes. In an exemplary embodiment, the oxidizing solution containing hypochlorite ions and the exposure time is about 30 minutes.

After exposure, the coupon containing an oxidized membrane is removed from the tank containing the oxidizing solution and is washed with deionized or RO water. The washing can be performed in one step or in multiple steps. For example, the coupon can be rinsed with deionized or RO water for a period of time of at least 1 minute, optionally followed by soaking the coupon in a water bath for a time period of at least 1 minute. The washing step(s) can be performed for a period of time of 30 minutes or less, or 15 minutes or less, or 5 minutes or less. The washing step can be performed by dipping, immersing, coating, spraying, or any other application technique or combination thereof.

Following the washing step, the coupons can be immersed in bath containing reducing solution that includes a reducing agent in an amount from about 0.1 wt % to at or about 5 wt % reducing agent based on the weight of the solution. The time between the end of the treatment with the oxidizing solution and beginning of treatment with the reducing agent is generally 60 minutes or less. In some embodiments, the reducing solution is aqueous. An exemplary reducing agent is an alkali-metal meta-bisulfate in an amount from about 0.5 w % to about 1 wt % based on the weight of the solution. The pH of the reducing solution can be in the range of about 3.5 to about 8, or about 5 or less. The temperature of the reducing solution can be in the range of from about 5° C. to about 40° C. A preferred temperature is ambient temperature, such as from about 20° C. to about 26° C. The membrane can be exposed to the reducing agent at any pressure. In an open tank, the exposure pressure can be ambient pressure, such as from about 0.98 atmosphere (atm) to about 1 atm, or from about 101.32 kPa to about 101.325 kPa, or from about 14.4 psi to about 14.7 psi. In a closed tank that can be pressurized, the membrane can be exposed to the reducing agent at an elevated pressure. The exposure pressure can be, e.g., from at or about 25 psi to at or about 150 psi, e.g., 125 psi. The coupon can be exposed to the reducing solution for a period of about 30 minutes or less, or 15 minutes or less, or 5 minutes or less.

After treatment, the treated coupon is removed from the tank containing the reducing solution and is washed with deionized or RO water. The washing can be performed in one step or in multiple steps. For example, the coupon can be rinsed with deionized or RO water for a period of time of at least 1 minute, optionally followed by soaking the coupon in a water bath for a time period of at least 1 minute. The washing step(s) can be performed for a period of time of 30 minutes or less, or 15 minutes or less, or 5 minutes or less. The washing step can be performed by dipping, immersing, coating, spraying, or any other application technique or combination thereof.

The treated coupons then tested for salt passage and water flux, e.g., using an aqueous solution containing 2000 ppm of NaCl at room temperature and at an applied pressure of 225 psi using a flat sheet cell test apparatus. The testing can be conducted at a Reynolds number of 2500, so that build-up of rejected solutes at the membrane surface leads to a concentration of no more than 10% higher than that in the bulk. In most testing, membranes were run for 1 hour before performance characteristics (e.g., water flux and salt rejection) were measured.

Treatment on a Process Line

Figure 1B:
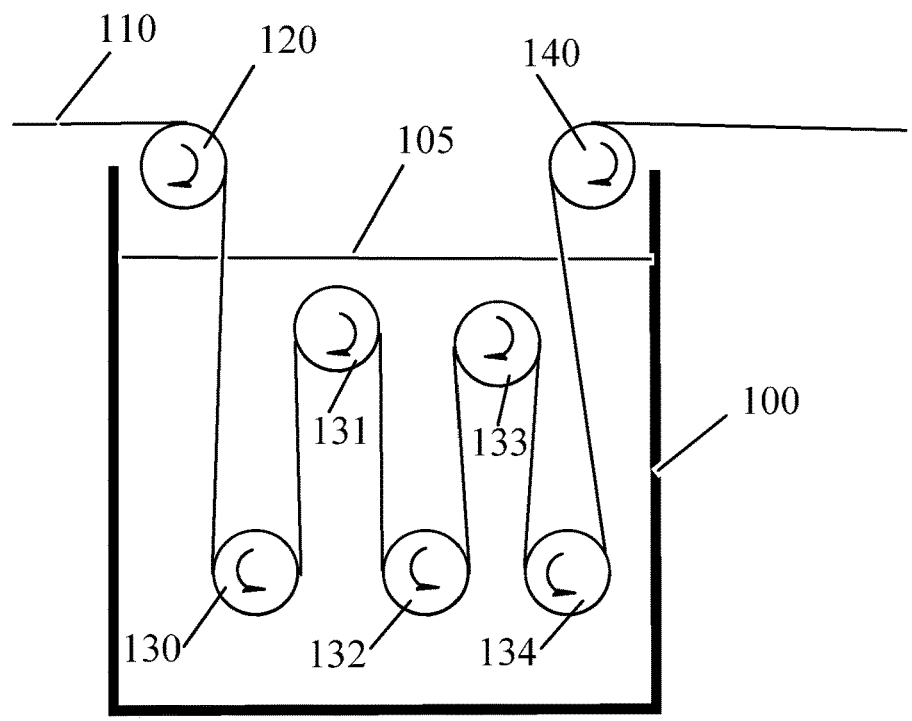
FIG. 1B is a diagram of an exemplary embodiment of a reaction tank containing a plurality of submerged guiding rollers to increase the effective residence time of a membrane in the reaction tank. The arrows show the direction of rotation of the guiding rollers.

Once formed, the TFC membrane can be subjected to post-formation treatment on a process line. In a batch or continuous process, the TFC membrane can be directed to a series of treatment tanks. The size and/or configuration of each treatment tank and the speed at which the membrane is moved through the tanks can be adjusted to achieve a desired treatment time in each tank. For example, the speed of the membrane can be increased to decrease residence time within the tanks, or the speed can be decreased to increase residence time within the tanks. The configuration of the pathway of the membrane in each tank also can be adjusted to modulate the residence time of the membrane within a treatment tank. For example, in order to increase residence time in a tank, instead of a single pass through the reaction tank, as illustrated in FIG. 1A, a plurality of guiding rollers can be included within the tank so that the membrane traverses the tank submerged in the liquid within the tank in a series of loops, as illustrated in FIG. 1B. In FIG. 1A, the TFC membrane 110 passes over the entry roller 120 to enter the reaction solution 105 within tank 100. The TFC membrane 110 travels over submerged guiding roller 130 and exits the tank via exit roller 140. In FIG. 1B, the TFC membrane 110 passes over the entry roller 120 to enter the reaction solution 105 within tank 100. The TFC membrane 110 travelers over submerged guiding rollers 130, 131, 132, 133, and 134 before exiting the tank via exit roller 140. The guiding rollers can be positioned in any configuration in order to modulate the path length through the tank in order to achieve the desired residence time. Although the illustrated diagram has the guiding rollers positioned so that the membrane traverses vertically through the reaction solution within the tank, the guiding rollers also can be positioned so that the membrane traverses horizontally through the reaction solution, or can be positioned so that the membrane traverses the reaction solution though a combination of vertical and horizontal configurations, or diagonally through the reaction solution.

In an exemplary embodiment, the TFC membrane can be immersed in and traverse a first bath containing an oxidizing solution that includes an oxidizing agent in an amount from about 1 ppm to at or about 50 ppm oxidizing agent. In some embodiments, the oxidizing solution is aqueous. An exemplary oxidizing agent is an alkali-metal hypochlorite or alkaline-earth-metal hypochlorite, and can be present in an amount from about 5 ppm to about 50 ppm, or about 7 ppm to about 35 ppm. The pH of the oxidizing solution can be in the range of 10 to 11, or a pH from about 10 to about 10.5, or a pH of 10.4 or less. The temperature of the oxidizing solution can be in the range of from about 5° C. to about 40° C. A preferred exposure temperature is ambient temperature, such as from about 20° C. to about 26° C. The membrane can be exposed to the oxidizing agent at any pressure. In an open tank, the exposure pressure can be ambient pressure, such as from about 0.98 atmosphere (atm) to about 1 atm, or from about 101.32 kPa to about 101.325 kPa, or from about 14.4 psi to about 14.7 psi. In a closed tank that can be pressurized, the membrane can be exposed to the oxidizing agent at an elevated pressure. The exposure pressure can be, e.g., from at or about 25 psi to at or about 150 psi, e.g., 125 psi. The membrane can be exposed to the oxidizing solution for a time period of from about 5 minutes to about 90 minutes. The membrane can be exposed to the oxidizing solution for a period of time of about 30 minutes or less, or 15 minutes or less, or 5 minutes or less. In an exemplary embodiment, the oxidizing solution contains hypochlorite ions and the exposure time is about 30 minutes.

After exposure, the treated membrane exits the first treatment bath and is washed with deionized or RO water. The washing can be performed in one step or in multiple steps. For example, the membrane can be rinsed with deionized or RO water for a period of time of at least 1 minute, optionally followed by passing the membrane through a water bath for a time period of at least 1 minute. The washing step(s) can be performed for a period of time of 30 minutes or less, or 15 minutes or less, or 5 minutes or less. The washing step can be performed by dipping, immersing, coating, spraying, or any other application technique or combination thereof.

Following the washing step, the membrane is directed to a second treatment bath in which it can be immersed in a reducing solution that includes a reducing agent in an amount from about 0.1 wt % to at or about 5 wt % reducing agent based on the weight of the solution. The time between the end of the treatment with the oxidizing solution and beginning of treatment with the reducing agent is generally 60 minutes or less. In some embodiments, the reducing solution is aqueous. An exemplary reducing agent is an alkali-metal meta-bisulfate in an amount from about 0.5 w % to about 1 wt % based on the weight of the solution. The pH of the reducing solution can be in the range of from about 3.5 to about 8, or about 5 or less. The temperature of the reducing solution can be in the range of from about 5° C. to about 40° C. A preferred temperature is ambient temperature, such as from about 20° C. to about 25° C. The membrane can be exposed to the reducing agent at any pressure. In an open tank, the exposure pressure can be ambient pressure, such as from about 0.98 atmosphere (atm) to about 1 atm, or from about 101.32 kPa to about 101.325 kPa, or from about 14.4 psi to about 14.7 psi. In a closed tank that can be pressurized, the membrane can be exposed to the reducing agent at an elevated pressure. The exposure pressure can be, e.g., from at or about 25 psi to at or about 150 psi, e.g., 125 psi. The membrane can be exposed to the reducing solution for a period of time of about 30 minutes or less, or 15 minutes or less, or 5 minutes or less.

After treatment, the treated membrane exits the second treatment tank and is washed with deionized or RO water. The washing can be performed in one step or in multiple steps. For example, the membrane can be rinsed with deionized or RO water for a period of time of at least 1 minute, optionally followed by passing the membrane through a water bath for a time period of at least 1 minute. The washing step(s) can be performed for a period of time of 30 minutes or less, or 15 minutes or less, or 5 minutes or less. The washing step can be performed by dipping, immersing, coating, spraying, or any other application technique or combination thereof. The treated membrane then can stored and/or used in a module, or directed to other post-treatment processing, such as application of a surface treatment to, e.g., avoid adsorption of foulants.

Treatment of a Membrane within a Module

In some embodiments, the post-formation treatment of the membrane is done to the membrane in a module. The membranes in a module can be spirally wound around a central porous permeate collection tube to form a module. In an exemplary embodiment, a module is loaded in a pressure vessel and rinsed using deionized or RO permeate water for a period of time from about 5 minutes to about 30 minutes, or a period of time of about 25 minutes or less, at a pressure from about 25 psi to about 150 psi, e.g., 125 psi.

Following the washing step, an oxidizing solution containing an oxidizing agent can be introduced into the element. The oxidizing agent can be present in an amount from about 1 ppm to at or about 50 ppm. In some embodiments, the oxidizing solution is aqueous. An exemplary oxidizing agent is an alkali-metal hypochlorite or alkaline-earth-metal hypochlorite in an amount from about 1 ppm to about 50 ppm. The pH of the oxidizing solution can be in the range of about 10 to about 11, or from about 10 to about 10.5, or a pH of 10.4 or less. The temperature of the oxidizing solution can be in the range of from about 5° C. to about 40° C. A preferred exposure temperature is ambient temperature, such as from about 20° C. to about 25° C.

The membrane can be exposed to the oxidizing agent at any pressure. For example, the module can be contacted with the oxidizing solution at an elevated pressure. The exposure pressure can be, e.g., from at or about 25 psi to at or about 150 psi, e.g., 125 psi. The membrane can be exposed to the oxidizing solution for a time period of from about 5 minutes to about 90 minutes. In an exemplary embodiment, the oxidizing solution contains hypochlorite ions and the exposure time is about 30 minutes. The membrane can be exposed to a constantly flowing oxidizing solution. Alternatively, the oxidizing solution can flow through the membrane form a desired time period, or until the amount of oxidizing agent measured in the permeate reaches a predetermined level, and then the flow of the oxidizing solution can be stopped, and the oxidizing solution can remain relatively stationary in the membrane within the module for a desired amount of time. For example, an oxidizing solution containing hypochlorite ions can be pumped through the module until the measured amount of free chlorine in the permeate is at least 50%, or at least 60%, or at least 70%, or at least 80%, or at least 90% of the total amount of free chlorine in the oxidizing solution. Forced flow of the oxidizing solution across the membrane then can be stopped.

After the targeted amount of time of exposure, the treated membrane is washed with deionized or RO permeate water. The membrane can be rinsed with deionized or RO water for a period of time of at least 1 minute, or for a period of time of 30 minutes or less, or 15 minutes or less, or 5 minutes or less.

Following the washing step, the membrane is subjected to treatment with a reducing solution that includes a reducing agent in an amount from about 0.1 wt % to at or about 5 wt % reducing agent based on the weight of the solution. The time between the end of the treatment with the oxidizing solution and beginning of treatment with the reducing agent is generally 60 minutes or less. In some embodiments, the reducing solution is aqueous or contains water. An exemplary reducing agent is an alkali-metal meta-bisulfite in an amount from about 0.5 w % to about 1 wt % based on the weight of the solution. The pH of the reducing solution can be in the range of about 3.5 to about 8, or about 5 or less. The temperature of the reducing solution can be in the range of from about 5° C. to about 40° C. A preferred temperature is ambient temperature, such as from about 20° C. to about 25° C.

The membrane can be exposed to the reducing agent at any pressure. For example, the module can be retained in the pressure vessel and contacted with the reducing solution at an elevated pressure. The exposure pressure can be, e.g., from at or about 25 psi to at or about 150 psi, e.g., 125 psi. The membrane can be exposed to the reducing solution for a period of time of about 60 minutes or less, or 30 minutes or less, or 15 minutes or less, or 5 minutes or less. After the targeted amount of time of exposure, the module containing the treated membrane is washed with deionized or RO permeate water. The membrane can be rinsed with deionized or RO water for a period of time of at least 1 minute, or for a period of time of 30 minutes or less, or 15 minutes or less, or 5 minutes or less.

Alternatively, after exposure to the oxidizing agent to form an oxidized membrane, the module can be removed from the pressure vessel and placed in a tank containing the reducing solution. In an open tank, the exposure pressure can be ambient pressure, such as from about 0.98 atmosphere (atm) to about 1 atm, or from about 101.32 kPa to about 101.325 kPa, or from about 14.4 psi to about 14.7 psi. The membrane can be exposed to the reducing solution for a period of time of about 60 minutes or less, or 30 minutes or less, or 15 minutes or less, or 5 minutes or less. After the targeted amount of time of exposure, the module containing the treated membrane can be washed with deionized or RO permeate water. The membrane can be rinsed with deionized or RO water for a period of time of at least 1 minute, or for a period of time of 30 minutes or less, or 15 minutes or less, or 5 minutes or less. In some application, the reducing solution can be retained in the module.

F. Membrane Characteristics

Water flux can be determined by measuring permeate flow using Equation 1:

$$\text{Flux } (gfd) = \frac{\text{permeate (gallons)}}{\text{membrane area } (\text{ft}^2) \cdot \text{time (day)}}.$$

Salt rejection (R, in %) can be calculated using Equation 2:

$$R\ (\%) = \left(1 - \frac{Cp}{Cf}\right) \times 100$$

where $C_f$ is the concentrations of salt in the feed water and the ($C_p$ is the concentrations of salt in the permeate, both of which can be measured using a calibrated conductivity meter.

G. Examples

Example 1—Preparation of TFC Membrane

An aqueous phase was prepared. The aqueous phase contained 4.5 wt % triethylamine camphorsulfonate (TEACSA, Sunland Chemicals, Los Angeles, Calif.), 3.5 wt % m-phenylene diamine (MPD, Dupont, Wilmington, Del.) and 0.06 wt % sodium lauryl sulfate (SLS), available from Fisher Scientific, Waltham, Mass.), 1 wt % hexamethylphosphoramide (HMPA) (Sigma Aldrich, St. Louis, Mo.) and 0.11 wt % $Sr(F6acac)_2$, where F6acac refers to 1,1,1,5,5,5-hexafluoroacetyl-acetonate (see U.S. patent application Ser. No. 14/730,151, filed Jun. 3, 2015). The aqueous phase was prepared by first adding the deionized (DI) water to a mixing vessel, followed by addition of the TEACSA, MPD and SLS, HMPA and $Sr(F6acac)_2$, although any permutation of order of addition of the components can be used.

An organic phase was prepared. The organic phase solution contained 0.287 wt % TMC (Sigma Aldrich, St. Louis, Mo.) and 4 wt % mesitylene (1,3,5-trimethylbenzene, Sigma Aldrich, St. Louis, Mo.) in an isoparafinnic solvent, Isopar™ G solvent (a low odor, low aromatic hydrocarbon solvent from ExxonMobile Chemical Company, Houston, Tex.). The organic phase was prepared by placing the Isopar G in a vessel, and mixing in the TMC and mesitylene in any order.

Membrane Formation

A polyester non-woven reinforced polysulfone support was used. The aqueous phase was applied to the polysulfone support at ambient temperature (25° C.) and pressure (1 atm). After 10 seconds, any excess aqueous solution remaining on the surface of the support layer was absorbed or pushed with a roller or air knife to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes. The membrane then was rinsed with 60° C. water for 6 to 8 minutes.

Comparative Examples 2 Through 4 and Example 5

The membranes were subjected to post-formation treatments. In Comparative Example 2, the TFC membrane of Example 1 was treated with deionized water at ambient temperature and pressure for a total time of 45 minutes before testing. For Comparative Example 3, the TFC membrane of Example 1 was treated with deionized water at ambient temperature and pressure for 35 minutes, then exposed to an aqueous solution containing 1 wt % sodium meta-bisulfite for 5 minutes, followed by a rinsing step with deionized water for a period of 5 minutes. For Comparative Example 4, the TFC membrane of Example 1 was treated with an aqueous solution containing 30 ppm hypochlorite ion (from sodium hypochlorite) at ambient temperature and pressure for 30 minutes, followed by a rinsing step with deionized water for a period of 15 minutes.

For Example 5, the TFC membrane of Example 1 was treated with an aqueous solution containing 30 ppm hypochlorite ion (from sodium hypochlorite) at ambient temperature and pressure for 30 minutes, followed by a rinsing step with deionized water at ambient temperature and pressure for 5 minutes, then exposed to an aqueous solution containing 1 wt % sodium meta-bisulfite (SMB) for 5 minutes, followed by a rinsing step with deionized water for a period of 5 minutes.

Membrane performance was measured in a flat sheet cell test apparatus. The testing was conducted at a Reynolds number of 2500, so that build-up of rejected solutes at the membrane surface leads to a concentration of no more than 10% higher than that in the bulk. Testing was performed on brackish water (2,000 ppm NaCl in deionized or RO water) at 225 psi, at 25° C. Membranes were run for 1 hour before performance characteristics (e.g., water flux and salt rejection) were measured. Treated membranes were tested again after running overnight. Water flux was determined by measurement of permeate flow as previously described, using Equation 1. The concentrations of salt in the feed water ($C_f$) and the permeate ($C_p$) were measured using a calibrated conductivity meter, and salt rejection R (in %)

was calculated using Equation 2. The results for the membranes of Comparative Examples 2-4 and Example 5 are shown in Table 1.

TABLE 1

Membrane Characteristics

| Example | Post-Formation Treatment | Flux (gfd) | Change (%) | Rejection (%) | Change (%) |
|---|---|---|---|---|---|
| Comp. 2 | Deionized Water | 21.1 | — | 99.55 | — |
| Comp. 3 | SMB (1 wt %) alone | 25.0 | 18.48 | 99.65 | 0.10 |
| Comp. 4 | Chlorination (30 ppm) Alone | 29.0 | 37.44 | 99.63 | 0.08 |
| 5 | Chlorination (30 ppm) + SMB (1 wt %) | 29.93 | 41.85 | 99.68 | 0.13 |
| Comp. 4 overnight | Chlorination (30 ppm) Alone | 30.1 | 42.65 | 99.57 | 0.02 |
| 5 overnight | Chlorination (30 ppm) + SMB (1 wt %) | 30.42 | 44.17 | 99.67 | 0.12 |

As can be seen from the data, the membrane of Example 5, which was treated with hypochlorite ions followed by quenching by treatment with sodium meta-bisulfite, demonstrated the greatest improvement in flux and also a positive impact on salt rejection.

Comparative Example 6 and Example 7

A TFC membrane containing a polyamide discrimination layer was prepared as described in Example 1. The performance of the untreated membrane was tested. Separate membranes were subjected to two different treatments. In Comparative Example 6, the membrane was treated with 30 ppm sodium hypochlorite in water at a pH of 10.5 for 30 minutes at 125 psi and 25° C., follow by washing the membrane with deionized water for 5 minutes. The washed membrane then was transferred to a deionized water bath and allowed to soak for 2 days in the water bath prior to performance testing.

In Example 7, the membrane was treated with 30 ppm sodium hypochlorite in water at a pH of 10.5 for 30 minutes at 125 psi and 25° C., followed by washing the membrane with deionized water for 5 minutes, followed by washing with deionized water for 5 minutes. The washed membrane then was transferred to a bath containing 0.2 wt % SMB and allowed to soak for 2 days in the SMB bath prior to performance testing.

Membrane performance was measured in a flat sheet cell test apparatus. The testing was conducted at a Reynolds number of 2500, so that build-up of rejected solutes at the membrane surface leads to a concentration of no more than 10% higher than that in the bulk. Testing was performed on brackish water (2,000 ppm NaCl in deionized or RO water) at 225 psi, at 25° C. Membranes were run for 1 hour before performance characteristics (e.g., water flux and salt rejection) were measured. Water flux was determined by measurement of permeate flow as previously described, using Equation 1. The concentrations of salt in the feed water ($C_f$) and the permeate ($C_p$) were measured using a calibrated conductivity meter, and salt rejection R (in %) was calculated using Equation 2. The results for the membranes of Comparative Example 6 and Example 7 are shown in Table 2.

TABLE 2

Membrane performance

Initial Performance Test

| Example | Flux (gfd) | Change (%) | Rejection (%) | Change (%) |
|---|---|---|---|---|
| Comp. Ex. 6 | 30.84 | — | 99.23 | — |
| Ex. 7 | 31.98 | — | 99.20 | — |

| Example | Flux (gfd) | Change* (%) | Rejection (%) | Change* (%) |
|---|---|---|---|---|
| Performance After Hypo Treatment | | | | |
| Comp. Ex. 6 | 35.36 | +14.66 | 99.51 | +0.28 |
| Ex. 7 | 36.51 | +14.17 | 99.50 | +0.30 |
| Performance After 48 hr. Soak | | | | |
| Comp. Ex. 6 | 39.70 | +28.73 | 99.24 | +0.01 |
| Ex. 7 | 36.82 | +15.13 | 99.51 | +0.31 |

*Change is with respect to the Initial Performance values

The data show that rejection and flux of the membrane was enhanced by treatment with NaOCl. In Comparative Example 6, the original improvement in salt rejection was lost after soaking for 48 hours in deionized water (from a rejection of 99.51% back to a rejection of 99.24%), and flux increased significantly compared to the initial test data. This is evidence of polymer degradation by residual active chlorine. In the SMB treated membrane of Example 7, the improvements in both flux and rejection were retained. After the 48 hour soak period, there was an improvement of flux and in salt rejection. The membrane treated as described in Comparative Example 6 had a yellow/orange color after treatment, a significant color change from that of the untreated membrane. In contrast, the membrane treated as described in Example 7 did not have a yellow/orange color and its color did not change substantially from the color of an untreated membrane.

Comparative Example 8

A TFC membrane containing a polyamide discrimination layer was prepared as described in Example 1. The performance of the untreated membrane was tested. The membrane was treated with 30 ppm sodium hypochlorite in water at a pH of 10.5 for 30 minutes at ambient pressure and 25° C., followed by washing the membrane with deionized water for 5 minutes. Performance of the membrane was tested after the washing step. The washed membrane then was transferred to a deionized water bath and allowed to soak overnight in the deionized water and performance testing was repeated. The results are shown in Table 3.

TABLE 3

Membrane performance without SMB treatment

| Condition | Flux (GFD) | Rejection (%) |
|---|---|---|
| initial membrane | 21.1 | 99.55 |
| Following Chlorination | 29 | 99.63 |
| After overnight wash | 30.1 | 99.57 |

As can be seen from the data, after the membrane was treated with 30 ppm hypochlorite for 30 minutes and washed with water, an increase in water flux and salt rejection was observed. Holding the membrane overnight in deionized water, however, resulted in decreased rejection. This is evidence of membrane deterioration, and suggests that, despite the washing with water after hypochlorite treatment, residual chlorine persists and continues to attack the membrane.

Example 9

A TFC membrane containing a polyamide discrimination layer was prepared as described in Example 1. The performance of the untreated membrane was tested. The membrane was treated with 30 ppm sodium hypochlorite in water at a pH of 10.5 for 30 minutes at ambient pressure and 25° C., followed by washing the membrane with deionized water for 5 minutes followed by treatment with 0.2 wt % SMB for 5 minutes. Performance of the membrane was tested after SMB treatment. The washed membrane then was transferred to a 0.2 wt % SMB bath and allowed to soak overnight, and performance testing was repeated. The results are shown in Table 4.

TABLE 4

Membrane performance with SMB treatment

| Condition | Flux (GFD) | Rejection (%) |
|---|---|---|
| initial membrane | 25 | 99.65 |
| Following Chlorination | 29.93 | 99.68 |
| After overnight wash | 30.42 | 99.67 |

As can be seen from the data, after the membrane was treated with 30 ppm hypochlorite for 30 minutes and treated in close temporal connection with SMB, increases in water flux and salt rejection were observed. After holding the membrane overnight in SMB, a slight improvement in flux was observed while no change in salt rejection was observed. The data show that quenching the chlorine oxidizing agent with SMB within a short duration of time destroys or neutralizes any residual chlorine that might persist, and minimizes or eliminates subjecting the membrane to excessive chlorination and structural damage.

Example 10

TFC membranes containing a polyamide discrimination layer were treated using the methods provided herein in a pressure vessel. An element containing a spirally wrapped membrane containing a polyamide discrimination layer prepared as described in Example 1 was loaded into a pressure vessel and treated with 30 ppm NaOCl in an aqueous solution at pH 10.4 for 30 minutes at 125 psi at 25° C., followed by a 5 minute wash with RO water. Six replicates were performed. Membrane performance was measured. Testing was performed on brackish water (2,000 ppm NaCl in deionized or RO water) at 225 psi, at 25° C. The modules then were treated with an aqueous solution containing 0.2 wt % sodium meta-bisulfite for 30 minutes at 25° C. and membrane performance was retested. The amount of time between the end of the period of exposure of the membrane to the oxidizing agent, and beginning the exposure of the oxidized membrane to a reducing agent, was less than 60 minutes. The average of the results are shown in Table 5.

TABLE 5

Module membrane performance

| Condition | Flux (gpd ± st. dev) | Change (%) | Rejection (% ± st. dev) | Change (%) |
|---|---|---|---|---|
| Initial Test | 10108 ± 142 | — | 99.54 ± 0.06 | — |
| After NaOCl | 11561 ± 140 | +14 | 99.61 ± 0.03 | +0.07 |
| After SMB | 11636 ± 239 | +15 | 99.61 ± 0.02 | +0.07 |

As can be seen from the data, after the membrane in the module was treated with 30 ppm hypochlorite for 30 minutes and then treated in close temporal connection with SMB (less than 60 minutes), an increase in water flux and salt rejection was observed. After holding the membrane overnight in SMB, a slight improvement in flux was observed while no change in salt rejection was observed. The data show that in a module, quenching the chlorine oxidizing agent with SMB within a short duration of time of treatment with the oxidizing agent destroys or neutralizes any residual chlorine that might persist, and minimizes or eliminates subjecting the membrane to excessive chlorination and structural damage.

Example 11 and Comparative Examples 12-14

TFC membranes containing a polyamide discrimination layer were prepared. The aqueous phase contained 6.75 wt % TEACSA, 3.5 wt % MPD, 0.06 wt % SLS, 0.5 wt % HMPA and 0.07 wt % $Sr(F6acac)_2$. The aqueous phase was prepared by first adding the DI water to a mixing vessel, followed by addition of the TEACSA, MPD and SLS, HMPA and $Sr(F6acac)_2$, although any permutation of order of addition of the components can be used. The organic phase solution contained 0.287 wt % TMC and 4 wt % mesitylene in an isoparafinnic solvent, Isopar™ G solvent. The organic phase was prepared by placing the Isopar G in a vessel, and mixing in the TMC and mesitylene in any order.

Membrane Formation

A polyester non-woven reinforced polysulfone support was used. The aqueous phase was applied to the polysulfone support at ambient temperature (25° C.) and pressure (1 atm). After 10 seconds, any excess aqueous solution remaining on the surface of the support layer was absorbed or pushed with a roller or air knife to remove any droplets. After removing droplets from the surface, the organic phase was applied. After 10 seconds, the orientation of the membrane was changed to allow any excess organic phase to drain away, and the membrane was allowed to drain for 10 seconds. The membrane was then dried in an oven with the web reaching a temperature of 95° C. The membrane remained in the oven for 6 minutes. The membrane then was rinsed with 60° C. water for 6 to 8 minutes.

The membranes were treated with various amounts of sodium hypochlorite from 0 ppm to 600 ppm in an aqueous solution for 30 minutes at a pH of about 10 at 125 psi at 25° C., followed by a wash with RO water for 5 minutes, and then each of the separate membranes was treated with 0.2 wt % sodium meta-bisulfate (SMB) as a reducing agent in an aqueous solution for a time period of 30 minutes. For Example 11, the membrane was treated with 7 ppm NaOCl and then washed and treated with SMB. For Comparative Example 12, the membrane was treated with 0 ppm NaOCl and then washed and treated with SMB. For Comparative Example 13, the membrane was treated with 120 ppm NaOCl and then washed and treated with SMB. For Comparative Example 14, the membrane was treated with 600 ppm NaOCl and then washed and treated with SMB.

After treatment with the SMB, the membranes were washed with RO water and tested for flux and rejection using a flat sheet cell test apparatus. The results are shown in Table 6 below.

TABLE 6

Membrane performance

| Membrane | Initial Test | | After treatment | | | |
|---|---|---|---|---|---|---|
| | Flux (gfd) | Rejection (%) | Flux (gfd) | Change (%) | Rejection (%) | Change (%) |
| Example 11 | 31.82 | 99.65 | 47.67 | +49.81 | 99.77 | +0.12 |
| Comp. Ex. 12 | 30.60 | 99.68 | 38.43 | +25.59 | 99.73 | +0.05 |
| Comp. Ex. 13 | 31.25 | 99.67 | 53.33 | +70.66 | 99.75 | +0.08 |
| Comp. Ex. 14 | 30.27 | 99.63 | 55.76 | +84.21 | 99.60 | −0.03 |

The data shown in the table compares the membrane initial performance with that after chlorination at different levels of Cl followed by the SMB exposure. Treatment with SMB without any chlorination (Comp. Ex. 12) results in an initial flux increase in the membrane. This increase in flux is transitory and is only a temporary effect that goes away after several hours of continuous operation. Treating the membrane with an oxidizing agent followed by treatment with a reducing agent in close temporal connection, however, has a permanent effect on the membrane performance. The data show that the flux after chlorination increases with the increase in the Cl level. Salt rejection values increase at lower Cl concentration and then decrease dramatically at high levels of Cl. Although the initial data for treatment with up to 120 ppm Cl showed an improvement over untreated membranes, exposure to levels of Cl above 50 ppm for an extended period of time prior to quenching can weaken the membrane, having a detrimental effect on its stability and long-term performance. It has been observed that exposure to levels of Cl above 50 ppm for an extended period of time results in a membrane that has decreased resistance to cleaning chemicals. Weakened membrane performance can manifest during cleaning of the membrane, during which the membrane can be exposed to extremes in pH (where pH values can vary as low as pH 2 to as high as pH 13). In some embodiments, it has been determined that treatment with free Cl levels less than 50 ppm, and particularly less than 35 ppm, followed by quenching with a reducing agent, minimizes any negative effects of chlorination on the membrane performance while providing significant increase in both flux and salt rejection.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A process to improve water flux of a thin film composite (TFC) membrane containing a polyamide discrimination layer, the method comprising:

forming a discrimination layer by interfacial polymerization;
modifying the surface chemistry after formation of the discrimination layer by:
treating the TFC membrane after formation of the discrimination layer with an oxidizing solution comprising free chlorine in an amount from about 7 ppm to about 35 ppm at a pH in the range from about 10 to about 11 for a time period of least 5 minutes to react with the polyamide discrimination layer to form an oxidized membrane;
rinsing the oxidized membrane with water;
contacting the oxidized membrane with a reducing solution containing a reducing agent at a pH from about 4 to about 8 for a time period of at least 1 minute to form a treated membrane,
rinsing the treated membrane with water; and
applying a hydrophilic polymer layer comprising polyvinyl alcohol to the surface of the treated membrane followed by application of heat to provide a heat cure of the hydrophilic polymer layer,
wherein the amount of time between the end of the time period during which the membrane is treated with the oxidizing agent, and the beginning of contacting the oxidized membrane with a reducing agent is 60 minutes or less, and
wherein the reducing solution comprises an antichlor in an amount from about 0.1 wt % to about 5 wt % and the antichlor is selected from the group consisting of an alkali-metal bisulfite, an alkaline-earth-metal bisulfite, an alkali-metal meta-bisulfite, an alkali-metal thiosulfate, an alkaline-earth-metal thiosulfate, hydrogen peroxide and combinations thereof.

2. The process of claim 1, wherein the time period of treatment with the oxidizing solution is from about 5 minutes to about 90 minutes.

3. The process of claim 1, wherein the time period of treatment with the reducing solution is from about 1 minute to about 60 minutes.

4. The process of claim 1, wherein the oxidizing solution comprises molecular chlorine, hypochlorous acid, or hypochlorite ion or a combination thereof.

5. The process of claim 1, wherein the reducing solution comprises an alkali-metal meta-bisulfate.

6. The process of claim 1, wherein:
the oxidizing solution comprises free chlorine in an amount from about 7 ppm to about 35 ppm;
the reducing solution comprises an alkali-metal meta-bisulfate in an amount from about 0.1 wt % to about 5 wt %.

7. A reverse osmosis membrane prepared according to the process of claim 1, the membrane exhibiting a water flux greater than the water flux of the untreated TFC membrane.

8. A reverse osmosis module, comprising a reverse osmosis membrane prepared according to the process of claim 1 spirally wound around a central perforated tube.

9. A method of purifying brackish water containing 2,000 ppm or less NaCl, comprising contacting the brackish water with a reverse osmosis membrane of claim 7.

10. A method of purifying seawater, comprising contacting the seawater with a reverse osmosis membrane of claim 7.

* * * * *